(12) United States Patent
Collins et al.

(10) Patent No.: US 10,277,275 B2
(45) Date of Patent: Apr. 30, 2019

(54) AUDIO MEDIA STREAMING DEVICE

(71) Applicant: Google LLC, Mountain View, CA (US)

(72) Inventors: Micah Thomas Collins, Mountain View, CA (US); Michael Jon Sundermeyer, Palo Alto, CA (US); Kristen Beck, San Mateo, CA (US); Wenson Chern, Mountain View, CA (US); Philip Lee Ly, Mountain View, CA (US); Colleen Mischke, Sunnyvale, CA (US); Robert Jason Rose, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/848,005

(22) Filed: Sep. 8, 2015

(65) Prior Publication Data

US 2017/0070262 A1 Mar. 9, 2017

(51) Int. Cl.
*H04B 3/00* (2006.01)
*G06F 17/00* (2006.01)
(Continued)

(52) U.S. Cl.
CPC .................. *H04B 3/54* (2013.01); *H04N 5/64* (2013.01); *H04N 21/436* (2013.01);
(Continued)

(58) Field of Classification Search
CPC .. H04B 3/54; H04B 2203/545; H04N 21/436; H04N 5/64; H04R 2420/00; H04R 27/00;
(Continued)

(56) References Cited

U.S. PATENT DOCUMENTS 4,979,586 A * 12/1990 Lazzeroni .............. A42B 3/166
   181/129
6,185,627 B1 * 2/2001 Baker ..................... H04R 1/005
   327/99

(Continued)

FOREIGN PATENT DOCUMENTS

JP   H0722541      6/1993
JP   H0689561 A    3/1994
(Continued)

OTHER PUBLICATIONS

"Audioengine W3 Wireless DAC", Soundstagexperience, retrieved on Oct. 26, 2016 from http://audioengineusa.com/reviews/PDF/ W3review_soundstagexperience.com.pdf, Sep. 2013, 4 pages.

(Continued)

*Primary Examiner* — Xu Mei
(74) *Attorney, Agent, or Firm* — Byrne Poh LLP

(57) ABSTRACT

According to an aspect, an apparatus may include a media streaming device including electronic circuitry configured to receive media content wirelessly from a media content source, and an audio output cord segment having a first end portion configured to be coupled to an audio input port of the media streaming device, and a second end portion configured to be coupled to an audio rendering device, where the electronic circuitry is further configured to transmit audio content through the audio output cord segment to the audio rendering device.

17 Claims, 26 Drawing Sheets

(51) Int. Cl.
*H04B 3/54* (2006.01)
*H04N 5/64* (2006.01)
*H04N 21/436* (2011.01)
*G06F 17/30* (2006.01)
*H04R 3/12* (2006.01)

(52) U.S. Cl.
CPC .. *G06F 17/30743* (2013.01); *H04B 2203/545* (2013.01); *H04R 3/12* (2013.01); *H04R 2420/00* (2013.01); *H04R 2420/07* (2013.01)

(58) Field of Classification Search
CPC ....... H04R 29/00; H04R 3/12; G06F 17/3074; G06F 17/30743
USPC ........... 381/74, 123, 334, 77, 79, 82, 85, 58; 348/474, 564; 361/679.43, 679.44
See application file for complete search history.

(56) References Cited

U.S. PATENT DOCUMENTS

| | | | |
|---|---|---|---|
| 6,522,291 | B1 | 2/2003 | Noguchi et al. |
| 7,040,815 | B2* | 5/2006 | Hsu .................... H05K 7/20172 385/134 |
| 7,058,356 | B2 | 6/2006 | Slotznick |
| 7,209,348 | B2* | 4/2007 | Yazawa ............. H05K 7/20445 165/185 |
| 7,574,011 | B2* | 8/2009 | Meyer ..................... H04R 3/00 381/113 |
| 8,079,051 | B2 | 12/2011 | McCafferty et al. |
| 8,516,063 | B2 | 8/2013 | Fletcher |
| 8,782,237 | B2 | 7/2014 | Kambhatla |
| D713,364 | S | 9/2014 | Petersen et al. |
| 8,898,365 | B2 | 11/2014 | Masleid et al. |
| 8,941,782 | B2 | 1/2015 | Kim et al. |
| 9,282,363 | B2 | 3/2016 | Panje |
| 9,286,854 | B2 | 3/2016 | Klarke et al. |
| 9,396,511 | B2 | 7/2016 | Choi et al. |
| 9,432,622 | B1 | 8/2016 | Winsor et al. |
| D775,233 | S | 12/2016 | Beck et al. |
| 9,659,577 | B1* | 5/2017 | Langhammer .......... G10L 21/06 |
| 9,866,611 | B2 | 1/2018 | Omura et al. |
| 2002/0098892 | A1* | 7/2002 | Koike .................... A63F 13/10 463/43 |
| 2006/0205343 | A1* | 9/2006 | Runyon ............. H04B 7/15542 455/11.1 |
| 2007/0139570 | A1 | 6/2007 | Ohgiichi et al. |
| 2008/0310802 | A1 | 12/2008 | Hager et al. |
| 2009/0079264 | A1 | 3/2009 | Minami |
| 2009/0153536 | A1 | 6/2009 | Baba et al. |
| 2009/0269943 | A1 | 10/2009 | Palli et al. |
| 2010/0265644 | A1 | 10/2010 | Yu |
| 2010/0282506 | A1* | 11/2010 | Beraud ................. H05K 5/0047 174/520 |
| 2011/0164005 | A1 | 7/2011 | Miyata |
| 2012/0039051 | A1 | 2/2012 | Chang |
| 2012/0246240 | A1 | 9/2012 | Hanlon |
| 2013/0057760 | A1* | 3/2013 | Lee .................... H04N 21/4122 348/474 |
| 2013/0058036 | A1* | 3/2013 | Holzer .................. G06F 1/1632 361/679.44 |
| 2013/0111533 | A1 | 5/2013 | Klarke et al. |
| 2013/0169625 | A1 | 7/2013 | Choi et al. |
| 2013/0169653 | A1 | 7/2013 | Jung et al. |
| 2013/0182190 | A1 | 7/2013 | McCartney |
| 2013/0213730 | A1* | 8/2013 | Litovsky .................. H04R 1/02 181/199 |
| 2013/0250122 | A1 | 9/2013 | Binder |
| 2013/0328176 | A1 | 12/2013 | Chiu et al. |
| 2014/0003616 | A1* | 1/2014 | Johnson ............... H04R 29/001 381/74 |
| 2014/0049292 | A1 | 2/2014 | Popescu et al. |
| 2014/0068460 | A1 | 3/2014 | Heynen et al. |
| 2014/0068654 | A1 | 3/2014 | Marlow et al. |
| 2014/0068692 | A1 | 3/2014 | Archibong et al. |
| 2014/0146982 | A1 | 5/2014 | Pelosi et al. |
| 2014/0191909 | A1 | 7/2014 | Tinaphong et al. |
| 2014/0218622 | A1 | 8/2014 | Hayashi et al. |
| 2014/0340510 | A1 | 11/2014 | Ihlenburg et al. |
| 2014/0347559 | A1 | 11/2014 | Nishi et al. |
| 2014/0362294 | A1* | 12/2014 | Majid .................... H04N 5/445 348/564 |
| 2014/0372625 | A1 | 12/2014 | Dureau |
| 2015/0116927 | A1* | 4/2015 | Robinson .............. G06F 1/1632 361/679.43 |
| 2015/0146099 | A1 | 5/2015 | Zelniker et al. |
| 2015/0189218 | A1 | 7/2015 | Kim et al. |
| 2015/0281831 | A1* | 10/2015 | Ibusuki .................. H03F 3/183 381/74 |
| 2016/0041808 | A1* | 2/2016 | Pelland ................... G06F 3/162 381/123 |
| 2016/0065528 | A1 | 3/2016 | Weksler et al. |
| 2016/0085280 | A1 | 3/2016 | Harel et al. |
| 2016/0093417 | A1 | 3/2016 | Litterini et al. |
| 2016/0223756 | A1 | 8/2016 | Mori et al. |
| 2016/0330397 | A1 | 11/2016 | Wengreen |
| 2016/0380370 | A1 | 12/2016 | Li et al. |
| 2017/0052918 | A1 | 2/2017 | Wang |
| 2017/0070776 | A1 | 3/2017 | Collins et al. |
| 2018/0158580 | A1 | 6/2018 | Hanya |
| 2018/0204819 | A1 | 7/2018 | Naruse |
| 2018/0217949 | A1 | 8/2018 | Oster et al. |

FOREIGN PATENT DOCUMENTS

| | | |
|---|---|---|
| JP | H07153239 A | 6/1995 |
| JP | 2003332972 | 11/2003 |
| JP | 2008301440 | 12/2008 |
| WO | 2017044426 A1 | 3/2016 |
| WO | 2017044427 A1 | 3/2017 |

OTHER PUBLICATIONS

"Safety Information Premium Wireless Audio Adapter", Setup Guide, retrieved on Oct. 26, 2016 from http://audioengineusa.com/setupguides/W3setupguideV03.pdf, Aug. 1, 2012, 1 page.
International Search Report and Written Opinion for PCT Application No. PCT/US2016/50419, dated Nov. 2, 2016, 11 pages.
International Search Report and Written Opinion for PCT Application No. PCT/US2016/50423, dated Nov. 8, 2016, 12 pages.
Thurrott, "Microsoft Wireless Display Adapter First Impressions", Mobile content from SuperSite for Windows, retrieved on Oct. 21, 2016 from http://winsupersite.com/mobile/microsoft-wireless-display-adapter-first-impressions, Oct. 1, 2014, 11 pages.
"Roku Player Instruction Manual and Important Product Information", Roku, Copyright 2009-2012, 23 pages.
Non Final Office Action from U.S. Appl. No. 14/847,997, dated Jun. 27, 2016, 28 pages.
Final Office Action for U.S. Appl. No. 14/847,997, dated Jan. 27, 2017, 25 pages.
Notice of Allowance received for for U.S. Appl. No. 14/847,997, dated Apr. 11, 2017, 11 pages.
"Amazon HDMI Micro HDMI Flat Cord", Amazon, Amazon HDMI Micro HDMI Flat Cord, Jun. 9, 2015, www.amazon.com/degree-Standard-Normal-panasonic-blackmagic/dp/B00Z98KFT4, p. 108.
"System on Chip", Informatik, System on Chip, Jun. 12, 2014, www2.informatik.hu-berlin.de/~iks/Studienarbeit/node14.htm, pp. 1-2.
Office Action dated Jan. 25, 2019 in U.S. Appl. No. 15/726,859.
*ASCII Media Works*, "Basic Knowledge on Mechanisms of Smartphones", in Weekly ASCII, Jul. 31, 2013, pp. 8-9.
*Gijutzu-Hyohron Co., Ltd*, "Readily Use Mini iPod Touch—basics and useful techs (compatible with iOS8)", in Link Up, May 25, 2015, pp. 12-17, 58-63, and 68-69.
*Mainichi Communications, Inc.*, "iPhone Special" in Mac Fan, vol. 16, No. 306, Oct. 1, 2008, pp. 1-8.

(56) References Cited

OTHER PUBLICATIONS

Office Action dated Jan. 22, 2019 in JP Patent Application No. 2017-557055.

* cited by examiner

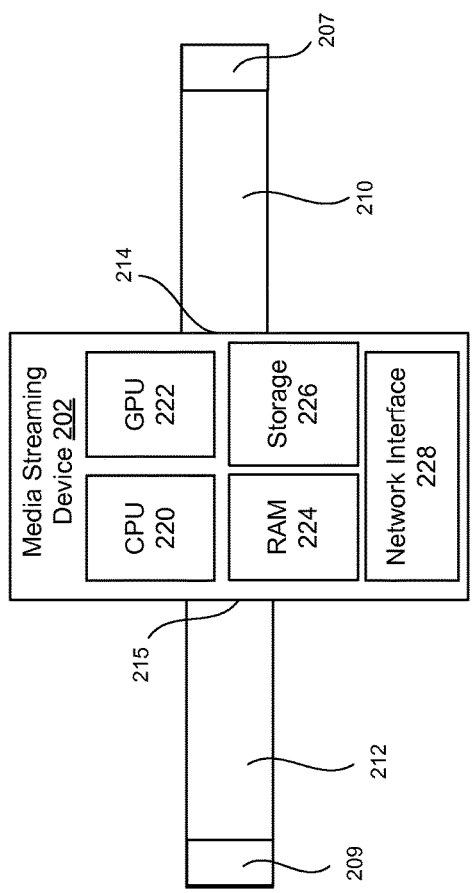
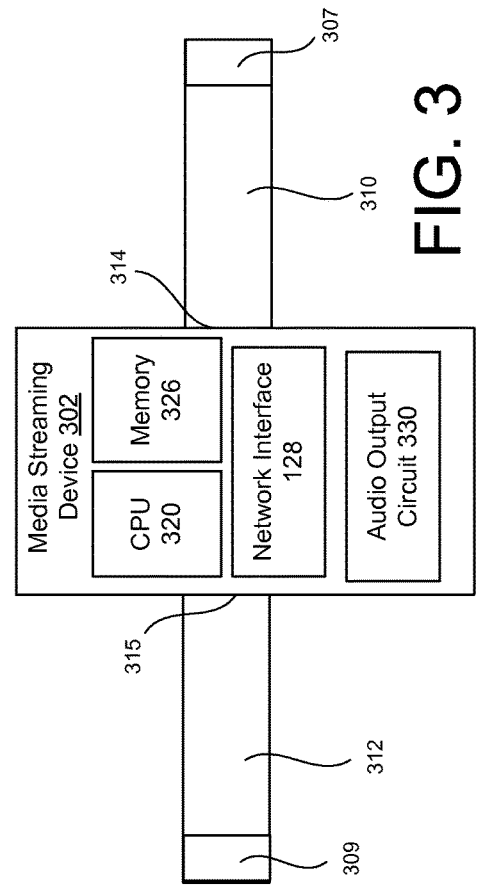
FIG. 2
FIG. 3

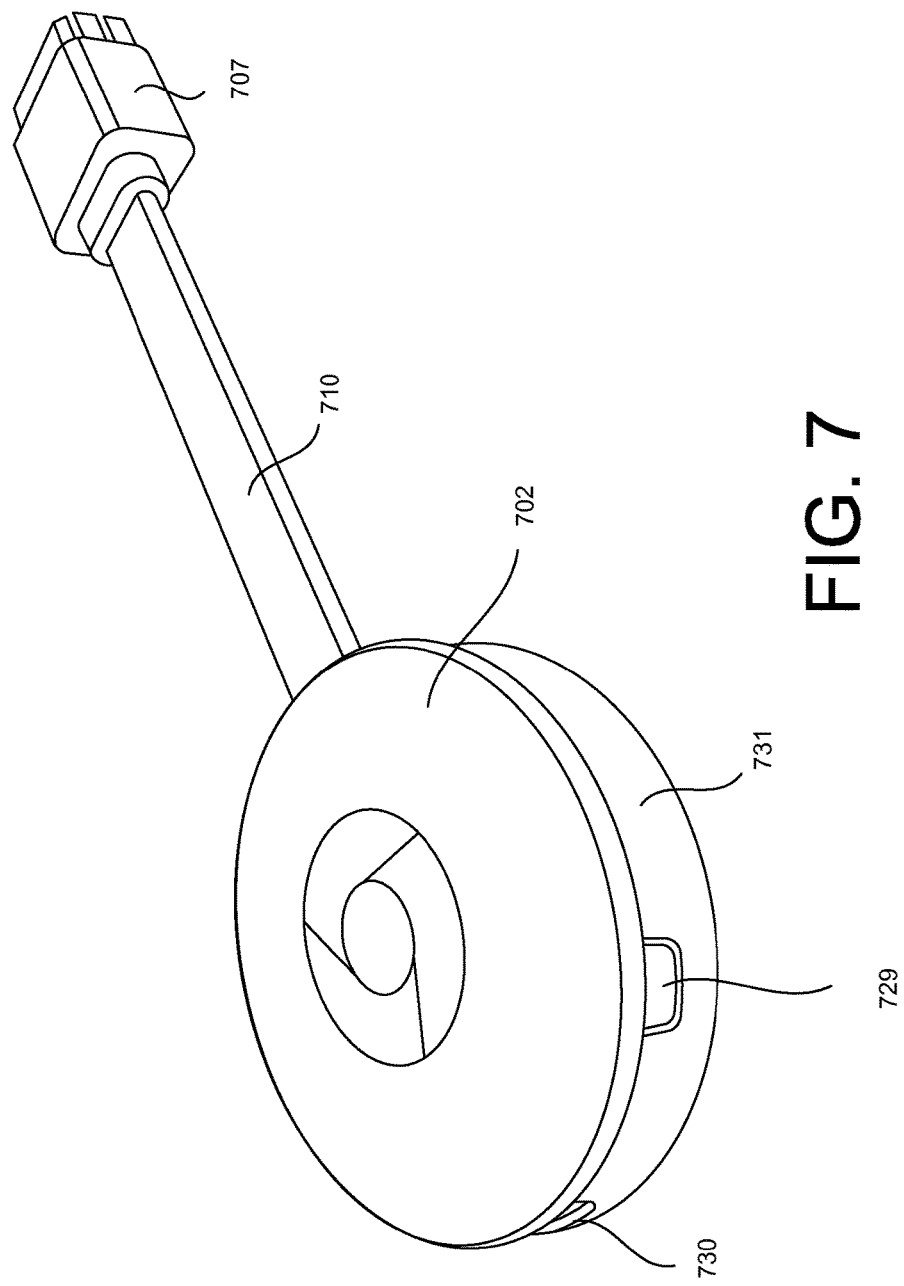

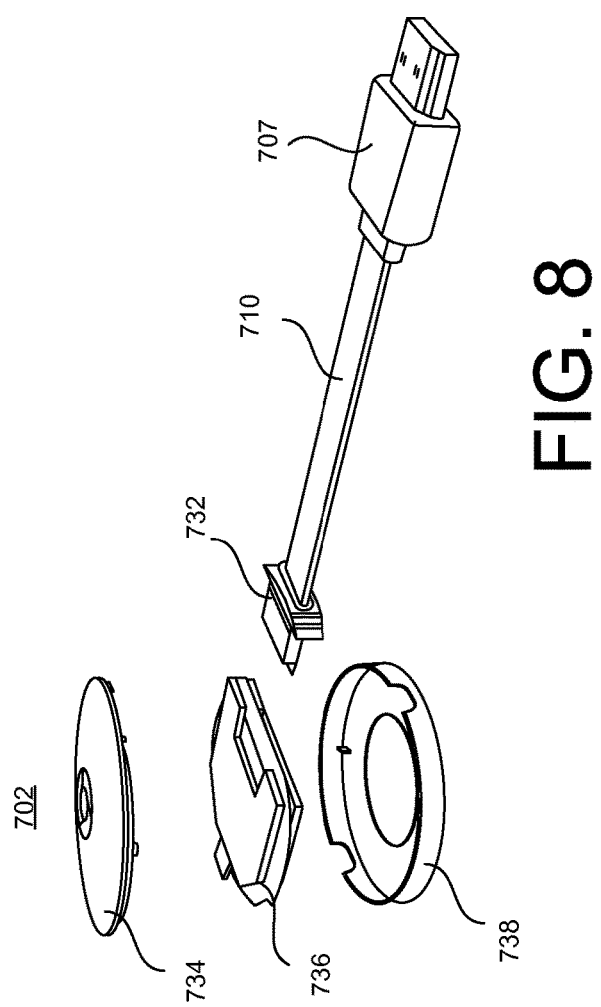

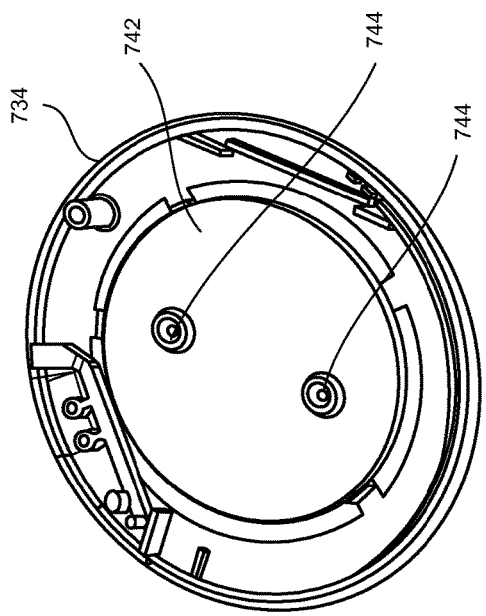
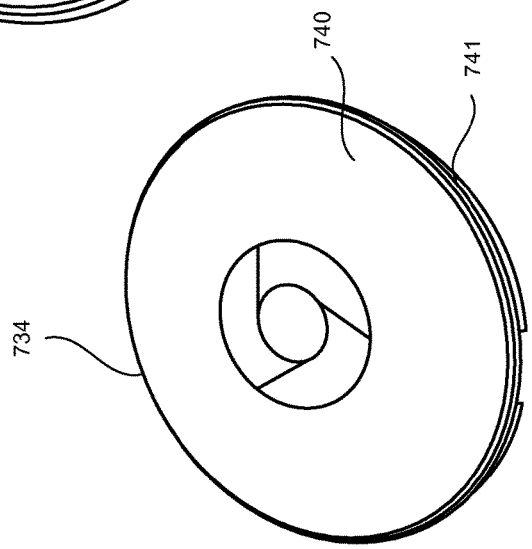
FIG. 9B
FIG. 9A

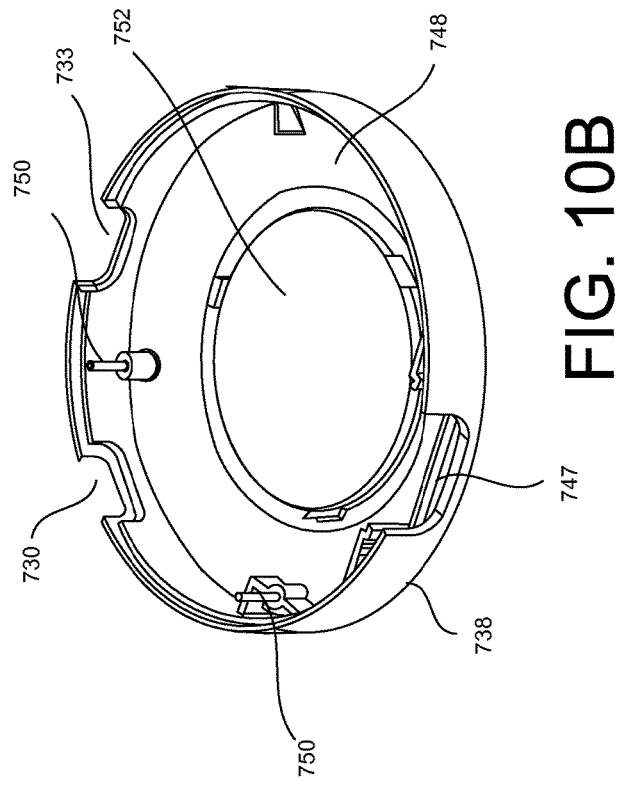
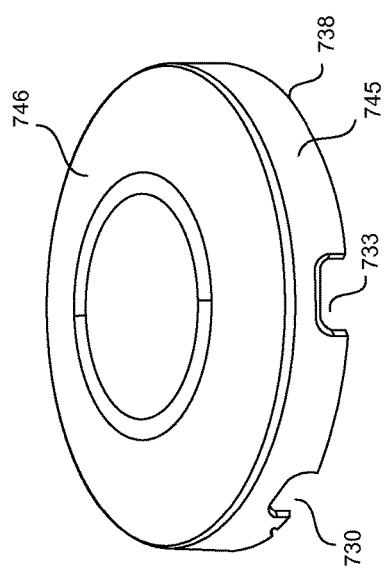
FIG. 10B
FIG. 10A

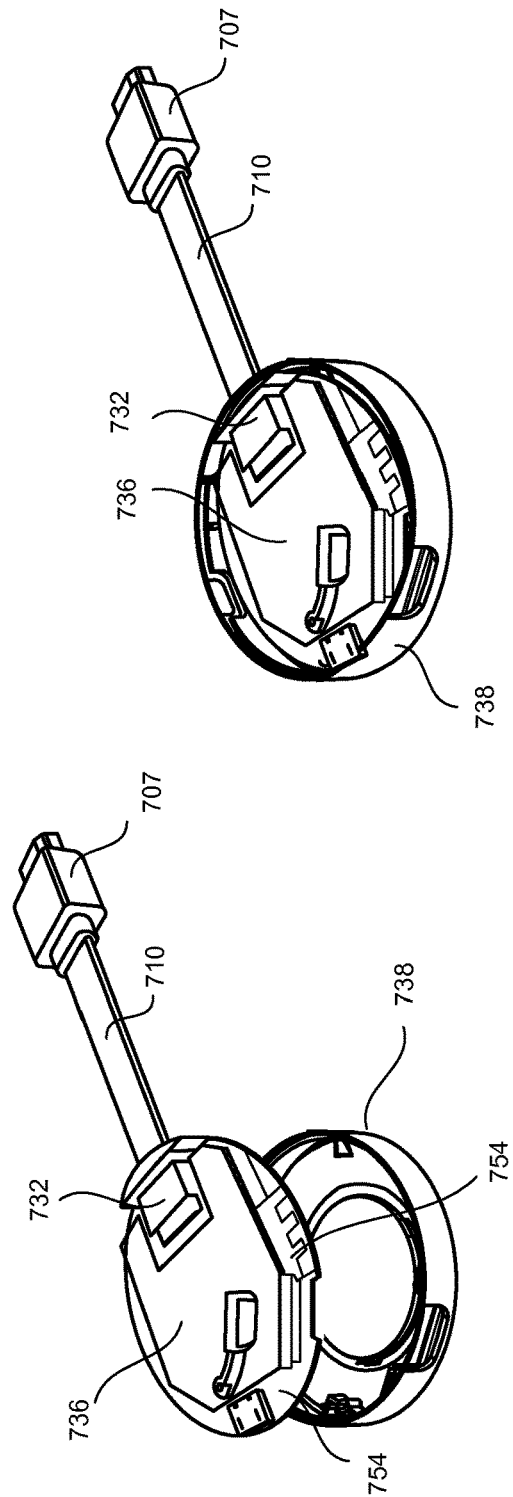

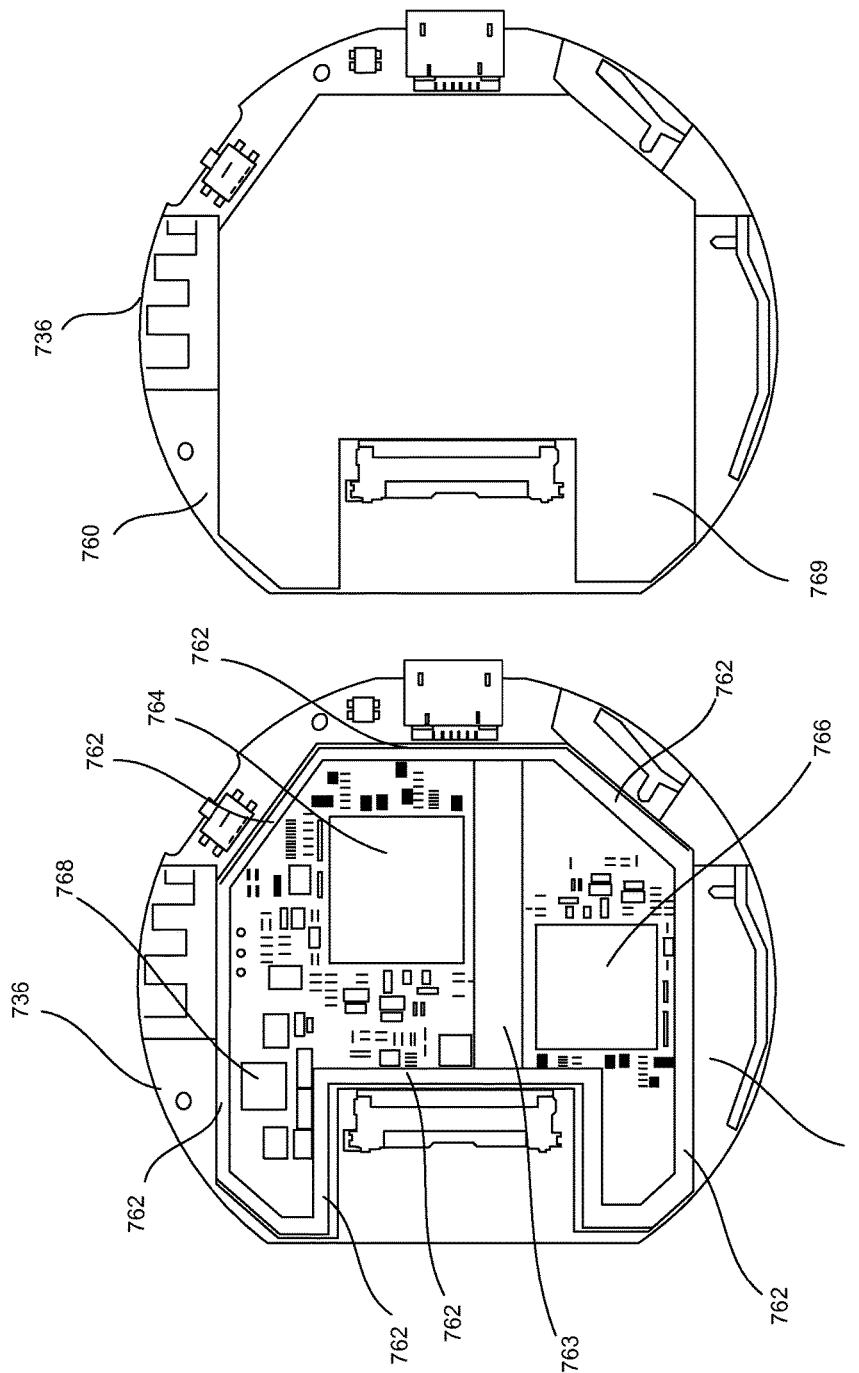

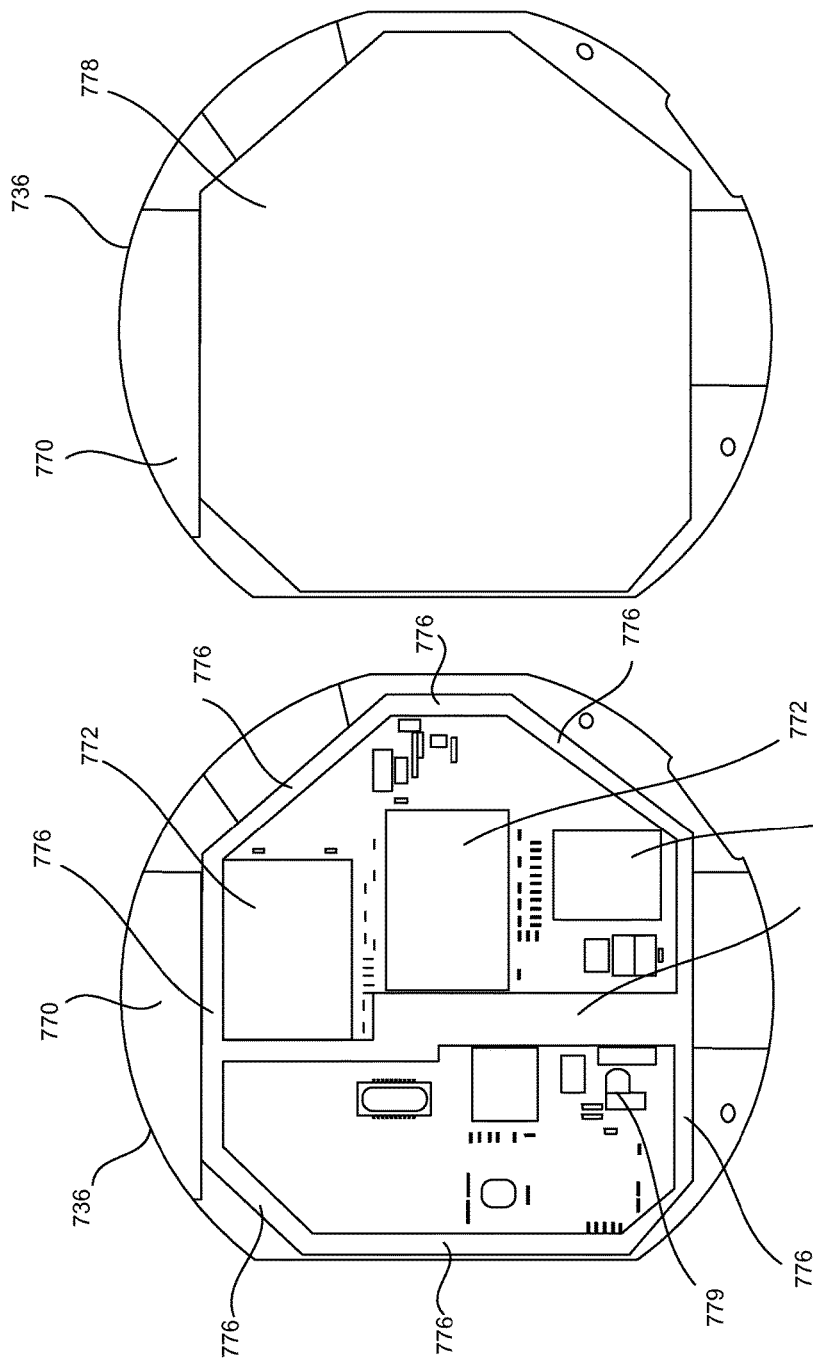

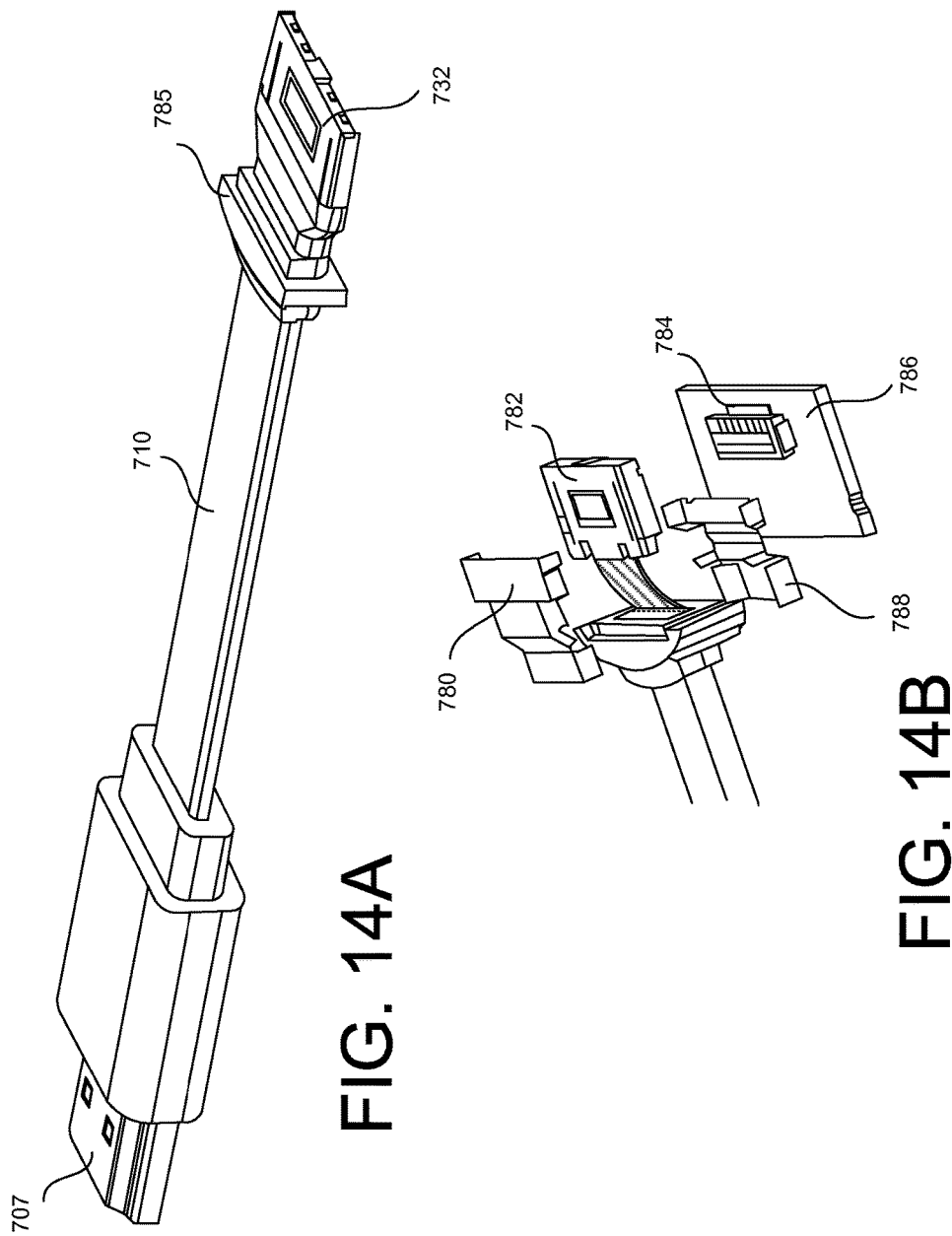

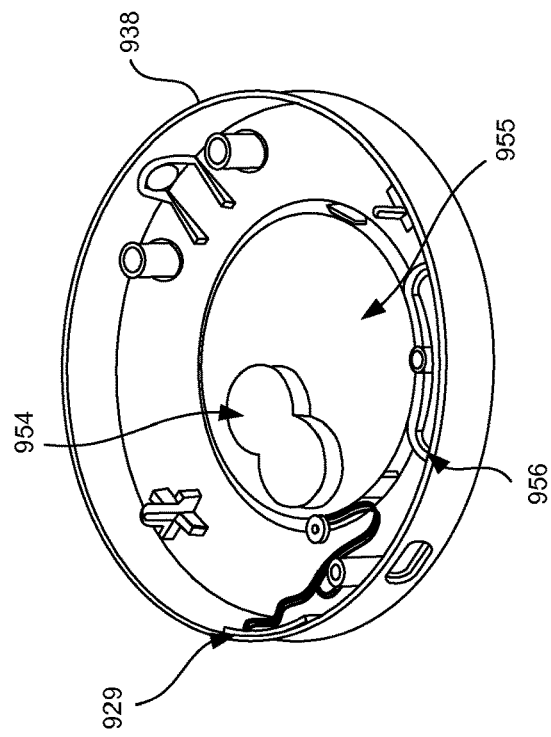
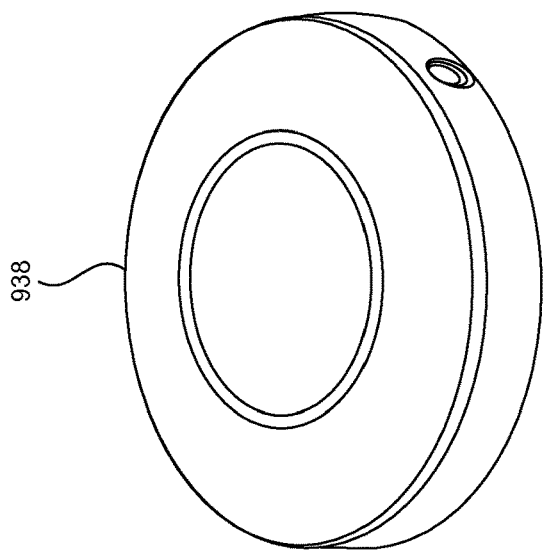
FIG. 24B
FIG. 24A

AUDIO MEDIA STREAMING DEVICE

BACKGROUND

Streaming media devices are used to stream content onto a receiving device. In some examples, a streaming media device may be plugged or coupled into a connector on a receiving device. Then, a device executing an application may provide video and/or audio content to the media streaming device, which is then provided to the receiving device for rendering. However, designing a media streaming device that provides good performance while being simple to install and use is a difficult and challenging task.

SUMMARY

The details of one or more implementations are set forth in the accompanying drawings and the description below. Other features will be apparent from the description and drawings, and from the claims.

According to an aspect, an apparatus may include a media streaming device including electronic circuitry configured to receive media content wirelessly from a media content source, and an output cord segment having a first end portion integrally coupled to a structure of the media streaming device, and a second end portion configured to be coupled to a receiving device, where the electronic circuitry is further configured to transmit the received media content through the output cord segment to the receiving device. The apparatus may include a power cord segment having a first end portion configured to be coupled to the media streaming device, and a second end portion configured to be coupled to a power source.

The apparatus may include one or more of the following features (or any combination thereof). When the second end portion of the output cord segment is coupled to the receiving device, the output cord segment may include one or more bent portions. The output cord segment may include one or more materials defining a rigidity such that the output cord segment is configured to maintain a distance between the receiving device and the media streaming device when the output cord segment is coupled to the receiving device, where the distance is greater than one half of a length of the output cord segment. The power cord segment may have a length greater than a length of the output cord segment. The output cord segment may have a width greater than a width of the power cord segment. The structure of the media streaming device may be substantially cylindrical. The first end portion of the output cord segment may define a low-voltage differential signaling (LVDS) connector, and the second end portion of the output cord segment may define a high-definition multimedia interface (HDMI) connector. The media streaming device may include a top enclosure assembly, a printed circuit board assembly with integrated circuits on both sides, and a bottom enclosure assembly, where the LVDS connector is coupled to the printed circuit board assembly. The power cord segment may include a universal serial bus (USB) cord having a USB connector on the second end portion and a micro-USB connector on the first end portion. The second end portion of the output cord segment may include a magnet configured to be magnetically coupled to the media streaming device. The media streaming device may be configured to provide video content from the media content source to the receiving device.

According to an aspect, an apparatus may include a media streaming device having electronic circuitry configured to receive media content wirelessly from a media content source. The media streaming device may include a printed circuit board assembly, and define a micro universal serial bus (USB) slot configured to receive a micro USB connector. The apparatus may include an output cord segment having a first end portion fixedly coupled to the media streaming device, and a second end portion configured to be coupled to a receiving device, where the electronic circuitry is further configured to transmit the received media content through the output cord segment to the receiving device. The first end portion may define a low-voltage differential signaling (LVDS) connector, and the LVDS connector may be coupled to the printed circuit board assembly. The apparatus may include a power cord segment having a first end portion defining the micro USB connector configured to be coupled to the media streaming device via the micro USB slot, the power cord segment having a second end portion configured to be coupled to a power source, where the output cord segment includes one or more materials defining a rigidity above a threshold value relative to a weight of the media streaming device, and the output cord segment is configured to position the media streaming device a distance away from a surface of the receiving device.

The apparatus may include one or more of the above or below features (or any combination thereof). The output cord segment may have a length in a range of 90-120 millimeters (mm). The media streaming device may have a substantially cylindrical shape with a diameter in a range of 45-55 millimeters (mm). The media streaming device may include a top enclosure assembly and a bottom enclosure assembly, where the printed circuit board assembly is disposed between the top enclosure assembly and the bottom enclosure assembly. The printed circuit board assembly may include a plurality of integrated circuits including a first integrated circuit and a second integrated circuit disposed on a same side of the printed circuit board assembly. The printed circuit board assembly may have a two-layer shield covering the plurality of integrated circuits, and the two-layer shield includes an internal frame with a shield wall separating the first integrated circuit and the second integrated circuit. The two-layer shield may include a cover shield coupled to the internal frame. The second end portion of the output cord segment may define a high-definition multimedia interface (HDMI) connector.

According to an aspect, an apparatus may include a media streaming device having electronic circuitry configured to receive media content wirelessly from a media content source, and the media streaming device may include a housing enclosing a printed circuit board assembly. The housing of the media streaming device may define a connector slot configured to receive a connector of a power cord segment. The media streaming device may include an output cord segment having a first end portion fixedly coupled to the printed circuit board assembly of the media streaming device, and a second end portion configured to be coupled to a receiving device, where the electronic circuitry is further configured to transmit the received media content through the output cord segment to the receiving device. The output cord segment may have a length and rigidity such that the output cord segment is configured to maintain a distance between the receiving device and the media streaming device, where the length of the output cord segment is less than a length of a display screen of the media streaming device, and the distance is equal to or greater than one half of the length of the output cord segment.

The apparatus may include one or more of the above or below features (or any combination thereof). The output cord segment may include a memory-shape material. The first end portion of the output cord segment may include a low-voltage differential signaling (LVDS) connector, where the LVDS connector is disposed inside the housing of the media streaming device.

According to an aspect, an apparatus may include a media streaming device including electronic circuitry configured to receive media content wirelessly from a media content source, and an audio output cord segment having a first end portion configured to be coupled to an audio input port of the media streaming device, and a second end portion configured to be coupled to an audio rendering device, where the electronic circuitry is further configured to transmit audio content through the audio output cord segment to the audio rendering device.

The apparatus may include one or more of the above or below features (or any combination thereof). The apparatus may include a power cord segment having a first end portion configured to be coupled to the media streaming device, and a second end portion configured to be coupled to a power source. The first end portion may be removably coupled to the audio input port of the media streaming device. The audio output cord segment may include a digital cord segment. The audio output cord segment may include an analog cord segment. A structure of the media streaming device may be substantially cylindrical. The media streaming device may include a top enclosure assembly, a printed circuit board assembly having a substrate with integrated circuits on a first surface and a second surface of the substrate, and a bottom enclosure assembly, where the top enclosure assembly is coupled to the bottom enclosure assembly via fasteners. A system on chip (SOC) may be disposed on the first surface of the substrate of the printed circuit board assembly, and an audio output circuit may be disposed on the second surface of the substrate of the printed circuit board assembly. The media streaming device may define a micro-USB connector configured to receive a micro-USB connector of a power cord segment.

According to an aspect, an apparatus may include a media streaming device including electronic circuitry configured to receive media content wirelessly from a media content source. The media streaming device may have a printed circuit board assembly. The media streaming device may define a micro universal serial bus (USB) slot configured to receive a micro USB connector. The apparatus may include an audio output cord segment having a first end portion configured to be coupled to an audio input port of the media streaming device, and a second end portion configured to be coupled to an audio rendering device, where the electronic circuitry is further configured to transmit audio content through the audio output cord segment to the audio rendering device. The apparatus may include a power cord segment having a first end portion defining the micro USB connector configured to be coupled to the media streaming device via the micro USB slot, where the power cord segment has a second end portion configured to be coupled to a power source.

The apparatus may include one or more of the above or below features (or any combination thereof). The media streaming device may have a substantially cylindrical shape with a diameter in a range of 45-55 millimeters (mm). The media streaming device may include a top enclosure assembly and a bottom enclosure assembly, where the printed circuit board assembly is disposed between the top enclosure assembly and the bottom enclosure assembly. The printed circuit board assembly may include a plurality of integrated circuits including a first integrated circuit and a second integrated circuit disposed on a same surface of a substrate of the printed circuit board assembly. The printed circuit board assembly may have a two-layer shield covering the plurality of integrated circuits, where the two-layer shield includes an internal frame with a shield wall separating the first integrated circuit and the second integrated circuit, and a cover shield coupled to the internal frame. The audio output cord segment may include a digital cord segment. The audio output cord segment may include an analog cord segment.

According to an aspect, an apparatus may include a media streaming device including electronic circuitry configured to receive media content wirelessly from a media content source. The apparatus may include an audio output cord segment having a first end portion configured to be coupled to an audio input port of the media streaming device, and a second end portion configured to be coupled to an audio rendering device, where the electronic circuitry includes an audio output circuit configured to detect a type of the audio output cord segment and format audio content according to the detected type. The electronic circuitry may be configured to transmit the formatted audio content through the audio output cord segment to the audio rendering device.

The apparatus may include one or more of the above or below features (or any combination thereof). The audio output circuit may be configured to detect whether the audio output cord segment is a digital-type cord or an analog-type cord. The audio output circuit may be coupled to a substrate of the media streaming device. The media streaming device may have a substantially cylindrical shape with a diameter in a range of 45-55 millimeters (mm). The media streaming device may include a top enclosure assembly, a printed circuit board assembly having a substrate with a first surface and a second surface, and a bottom enclosure assembly, where the top enclosure assembly is coupled to the bottom enclosure assembly via fasteners, and the audio output circuit is coupled to the first surface of the substrate.

BRIEF DESCRIPTION OF THE DRAWINGS

FIG. 2 illustrates a media streaming device configured to stream video content according to an implementation.

FIG. 3 illustrates a media streaming device configured to stream audio content according to an implementation.

FIG. 7 illustrates a media streaming device coupled to an output cord segment according to an implementation.

FIG. 8 illustrates an exploded view of the media streaming device of FIG. 7 according to an implementation.

FIG. 9A illustrates an external surface of the top enclosure assembly of the media streaming device according to an implementation.

FIG. 9B illustrates an internal surface of the top enclosure assembly of the media streaming device according to an implementation.

FIG. 10A illustrates an external surface of the bottom enclosure assembly of the media streaming device according to an implementation.

FIG. 10B illustrates an internal surface of the bottom enclosure assembly of the media streaming device according to an implementation.

FIG. 11A illustrates the printed circuit board assembly disassembled from the bottom enclosure assembly according to an implementation.

FIG. 11B illustrates the printed circuit board assembly assembled with the bottom enclosure assembly according to an implementation.

FIG. 12A illustrates a top side of the printed circuit board assembly depicting one layer of a two-layer shield according to an implementation.

FIG. 12B illustrates the top side of the printed circuit board assembly depicting the other layer of the two-layer shield according to an implementation.

FIG. 13A illustrates a bottom side of the printed circuit board assembly depicting one layer of a two-layer shield according to an implementation.

FIG. 13B illustrates the bottom side of the printed circuit board assembly depicting the other layer of the two-layer shield according to an implementation FIG. 14A illustrates the output cord segment having a connector on a first end portion of the output cord segment and a connector on the second end portion of the output cord segment according to an implementation.

FIG. 14B illustrates an exploded view of the connector on the first end portion of the output cord segment according to an implementation.

FIG. 24A illustrates an external view of the bottom enclosure assembly according to an implementation.

FIG. 24B illustrates an internal view of the bottom enclosure assembly according to another implementation.

DETAILED DESCRIPTION

The present disclosure provides a media streaming device suspended between two cord segments, where one cord segment is a cable for transferring media content over a particular media transfer interface (e.g., a high-definition multimedia interface (HDMI) output cable or audio cable), and the other cord segment is a power cord coupled to a power supply (e.g., DC or AC power supply). The media streaming device may be small and lightweight such that the media streaming device can be suspended between the two cord segments. In some examples, one or both of the two cord segments may be flexible yet sufficiently rigid to suspend the media streaming device. Further, the length of the cord segments may be designed such that the media streaming device is suspended at a position away from a receiving device in a manner that minimizes interference or port blocking of adjacent media transfer interface connections at the receiving device and/or far enough away from the receiving device to reduce negative effects on the device's radio-frequency (RF) performance.

The media streaming device may have a certain size, shape, and weight, and the cord segments may have a certain thickness such that from a point of view of the user, the overall streaming solution appears as a single continuation cord with an electronic module integrated within the cord. In some conventional media streaming devices, the connector directly extends from a housing of the media streaming device, and the connector of the media streaming device is plugged directly into the connector of the receiving device (e.g., a media streaming dongle or media streaming stick). In contrast, in various implementations of the present disclosure, the cord segment is coupled to the media streaming device and the connector is disposed on the end portion of the cord segment such that the receiving device is connected to the media streaming device via the cord segment, and the cord segment has a certain thickness and rigidity in order to suspend the media streaming device at a location away from the receiving device. In some examples, one or both of the cord segments may include a memory-shape material configured to maintain a certain shape.

Figure 1:
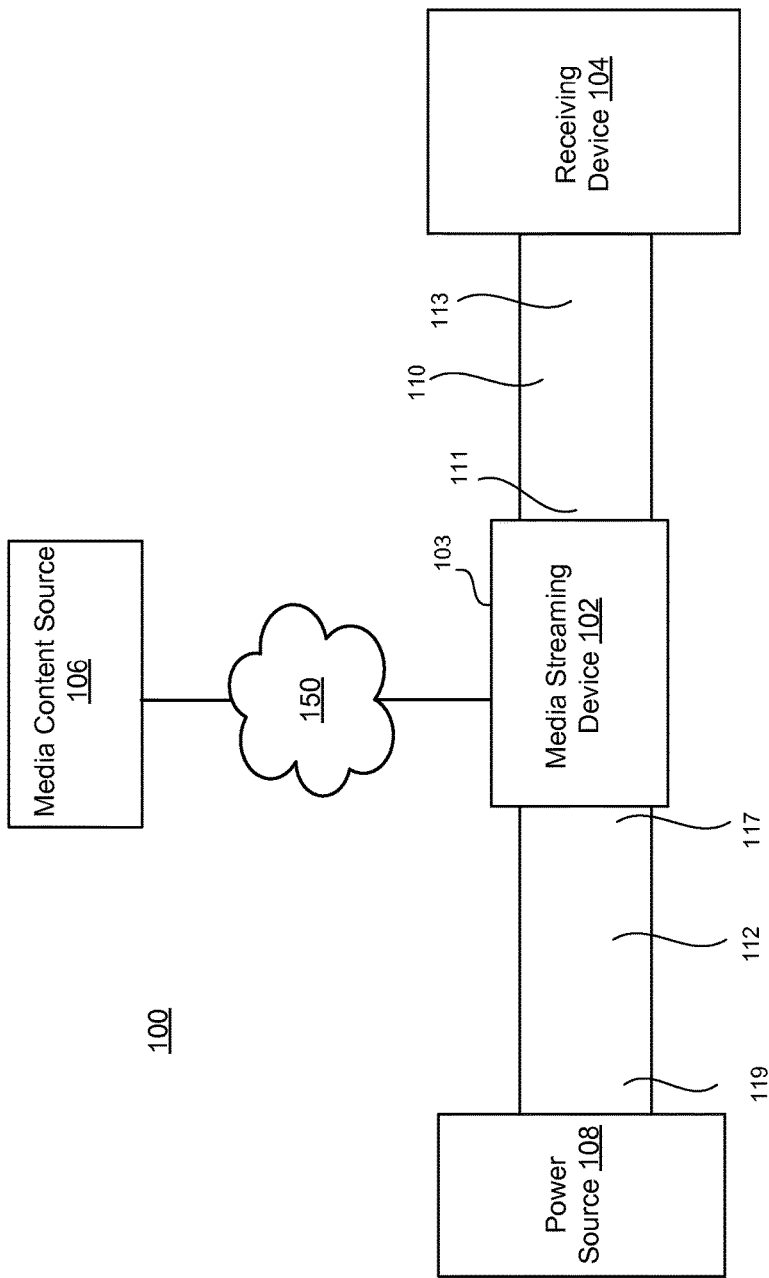
FIG. 1 illustrates a system for streaming media content according an implementation.

FIG. 1 illustrates a system 100 for implementing a streaming solution according an implementation. The system 100 includes a media streaming device 102 configured to transfer, over a wireless connection, streamed media content from a media content source 106 to a receiving device 104. The receiving device 104 may be any type of device capable of receiving and then rendering audio and/or video content. In some examples, the receiving device 104 may include or otherwise be connected to a display screen capable of displaying the video content. The display screen may be a liquid crystal display (LCD), plasma display, cathode tube, or any type of display screen technology known to one of ordinary skill in the art. The receiving device 104 may include or be connected to one or more speakers capable of rendering the audio content. In some examples, the receiving device 104 may be a television set, standalone display device, tablet, gaming console, or a laptop computer, etc. In some examples, the receiving device 104 may be an audio device capable of rendering the audio content (not the video content).

The media streaming device 102 may include a system on chip (SOC) and one or more wireless interfaces having one or more antenna structures designed to wirelessly receive and transmit data. The SOC may be an integrated circuit that integrates two or more components into a chip, and may contain digital, analog, mixed-signal, and may include radio-frequency functions. In other examples, the radio-frequency functions may be provided on a separate chip. The media streaming device 102 may be configured to stream the media content from the media content source 106 to the receiving device 104 over a network 150. The network 150 may be any type of public or private communication network such as the Internet (e.g. Wi-Fi, mobile network, etc.) or short-range communication network (e.g., Bluetooth, near-field communication (NFC), etc.). The media content may include video and/or audio data. The media content source 106 may be any type of device capable of providing the media content. The media content source 106 may be a consumer computing device such as a tablet, smartphone, desktop computer, laptop computer, tablet, gaming console, etc. In other examples, the media content source 106 may be one or more server devices that host one or more applications configured to provide the media content over the network 150.

The media streaming device 102 may have a housing 103 configured to house the components of the media streaming device 102. The components of the media streaming device 102 are further explained with reference to FIGS. 2 and 3. The housing 103 may be a unitary component or multiple components coupled together. The housing 103 may have a circular, rectangular, or any type of non-circular and/or non-rectangular shape. In some examples, the housing 103 may be cylindrical (e.g., puck shape).

The media streaming device 102 may be coupled to the receiving device 104 via an output cord segment 110, and the media streaming device 102 may be coupled to a power source 108 via a power cord segment 112. The output cord segment 110 may provide the physical connection between the media streaming device 102 and the receiving device 104, where the media content is routed from the media streaming device 102 to the receiving device 104 via the output cord segment 110. In some examples, the output cord segment 110 is an HDMI cord segment. In some examples, the output cord segment 110 is an audio cord segment (digital or analog).

The power cord segment 112 may provide the physical connection between the media streaming device 102 and the power source 108. The power source 108 may be an AC power source such as the AC wall socket, for example. In other examples, the power source 108 is a DC power source such as another computing device. The power cord segment 112 is configured to transfer power from the power source 108 to the media streaming device 102. In some examples, the power cord segment 112 is a universal serial bus (USB) power cord. In some examples, the power cord segment 112 is a USB power and data cord.

The power cord segment 112 may be longer than the output cord segment 110. In other examples, the power cord segment 112 is shorter than the output cord segment 110. In other examples, the power cord segment 112 is the same length as the output cord segment 110. In some examples, the power cord segment 112 has a larger diameter than the output cord segment 110. In other examples, the power cord segment 112 has a small diameter than output cord segment 110. In other examples, the power cord segment 112 as the same diameter as the output cord segment 110.

The output cord segment 110 may include one or more materials that are configured to transfer audio and/or video content from the media streaming device 102 to the receiving device 104. In some examples, the output cord segment 110 may include an outer material configured to enclose one or more metal wires. In some examples, the output cord segment 110 may include a first material that is flexible yet sufficient rigid to suspend the media streaming device 102. In some examples, the first material is a polymer-based material. In some examples, the first material is a memory-shape material. In some examples, the output cord segment 110 includes one or more memory-shape wires. In some examples, the power cord segment 112 includes a second material that is flexible yet sufficient rigid to suspend the media streaming device 102. In some examples, the second material is a polymer-based material. In some examples, the second material is a memory-shape material. In some examples, the first material is the same as the second material. In other examples, the first material is different than the second material.

The output cord segment 110 may include a first end portion 111 configured to be coupled to the housing 103 of the media streaming device 102, and a second end portion 113 configured to be coupled to the receiving device 104. The first end portion 111 may be fixedly coupled to the media streaming device 102. For example, the first end portion 111 may be integrally coupled to the housing 103 of the media streaming device 102. The first end portion 111 may define a connector configured to be coupled to a corresponding connector of the media streaming device 102. In some examples, the connectors may be contained within the housing 103 of the media streaming device 102 such that the output cord segment 110 is integrally coupled to the media streaming device 102. In some examples, the connector of the first end portion 111 is a low-voltage differential signaling (LVDS) connector. In some examples, the connector of the first end portion 111 is an audio-type connector. The second end portion 113 may be removably coupled to the receiving device 104. In some examples, the second end portion 113 may define a HDMI connector to be coupled to a HDMI connector associated with the receiving device 104. In some examples, the connector of the second end portion 113 is an audio-type connector configured to be coupled to a corresponding connector of the receiving device 104. In some examples, configurations of the output cord segment 110 and associated connectors are provided in Application No. 62/215,571, filed on Sep. 8, 2015, titled IMPROVED HIGH-DEFINITION MULTIMEDIA INTERFACE (HDMI) CABLE INTEGRATED WITH A MEDIA DEVICE, the contents of which are herein incorporated by reference in their entirety.

The power cord segment 112 may include a first end portion 117 configured to be coupled to the media streaming device 102, and a second end portion 119 configured to be coupled to the power source 108. The first end portion 117 of the power cord segment 112 may be removably coupled to the media streaming device 102. In other examples, the first end portion 117 of the power cord segment 112 may be fixedly coupled to the media streaming device 102. In some examples, the first end portion 117 of the power cord segment 112 may define a male USB connector to be coupled to a female USB connector on the media streaming device 102. The second end portion 119 of the power cord segment 112 may define a power plug adaptor to be inserted into a wall socket. In some examples, the second end portion 119 may define a USB connector configured to be coupled to a device. In some examples, the second end portion 119 may define a USB connector and a power plug adaptor, where the USB connector is removably coupled to the power plug adaptor. In some examples, the outer housing 103 of the media streaming device 102 may have a tubular shape that is the same or similar to the shape of the output cord segment 110 and/or the power cord segment 112. In some examples, the outer housing 103 may be larger than the output cord segment 110 and the power cord segment 112.

The media streaming device 102 may be relatively small and lightweight such that the cord segments 110, 112 can suspend the media streaming device 102 along the assembled system 100. In some examples, the output cord segment 110 integrally coupled to the media streaming device 102 is sufficiently rigid such that the output cord segment 110 can support the media streaming device's weight. For example, relative to the weight of the media streaming device 102, the material of the output cord segment 110 includes one or more properties that make the output cord segment 110 flexible yet rigid such that, when assembled, the output cord segment can support the weight of the media streaming device 102. In some examples, the output cord segment 110 may include one or more materials that define an elasticity above a certain threshold, and that threshold is chosen relative to the weight of the media streaming device 102. For instance, under the load of the media streaming device 102, the output cord segment 110 can substantially maintain its shape. The output cord segment 110 can have a certain non-bendability in the sense that it can substantially resist deformation in response to the weight of the media streaming device 102. In some examples, when a force greater than the force of the media streaming device 102 is applied to the output cord segment 110, the output cord segment 110 can bend and hold that bent shape.

Once assembled, the user may perceive the streaming solution (the media streaming device 102 with cord segments 110, 112) as a cable assembly with a power plug on one end and the output on the other end. For instance, when the connector of the output cord segment 110 is coupled to the receiving device 104 and the power cord segment 112 is coupled to the media streaming device 102 and the power source 108, the media streaming device 102 is configured to be suspended at a distance away from the receiving device 104.

The length of the output cord segment 110 may be designed such that it is short enough to remain relatively close to the receiving device 104 (e.g., potentially hidden from the user) but long enough to reduce one or more problems associated with plugging the media streaming device 102 directly into the receiving device's port. In some examples, the length of the output cord segment 110 may be less than a length of the receiving device 104. In some examples, the length of the output cord segment 110 may be less than a length (or width) of a display screen of the receiving device 104. Also, the material(s) of the output cord segment 110 have properties such that when a force is not applied to the media streaming device 102 (the media streaming device 102 being integrally coupled to one end of the output cord segment 110, the other end of the output cord segment 110 being coupled to the receiving device 104), the media streaming device 102 remains a distance from the receiving device 104 that is more than one half of the length of the output cord segment 110. At the same time, the output cord segment 110 can be sufficiently flexible to permit the user to bend the output cord segment 110 to a desired location (e.g., to hide the media streaming device 102 or improve the wireless functionality of the media streaming device 102).

In some examples, when coupled to the cord segments 110, 112, the media streaming device 102 is suspended in air. For instance, when coupled to the cord segments 110, 112, the media streaming device 102 does not contact (or otherwise rest) on the ground or another object (including the receiving device 104). Rather, the media streaming device 102 remains at a position away from the receiving device 104. In some examples, when the streaming solution is assembled, the output cord segment 110 bends (thereby creating one or more bend portions) to a certain point such that the media streaming device 102 does not contact any portion of the receiving device 104. In some examples, the output cord segment 110 includes one or more materials that define a certain rigidity that provide a stiffness (in relation to the media streaming device 102). In some examples, the corresponding port (e.g., HDMI port) of the receiving device 104 is located on a lateral side (or the back side) of the receiving device 104, and when the output cord segment 110 is coupled to the receiving device 104, the output cord segment 110 forces the media streaming device 102 a certain horizontal distance (e.g., more than 50% the length of the output cord segment 110) away from a surface of the receiving device 104. The output cord segment 110 can force the media streaming device 102 away from the surface of the receiving device 104 by not completely bending (e.g., the output cord segment 110 may slightly bend, but may maintain a certain shape until the user put additional force on the output cord segment 110 to move the media streaming device 102 to another location).

In some examples, the output cord segment 110 includes a bendable material, where the output cord segment 110 is configured to hold its shape (e.g., a moldable material). As such, a user may be able to deform the output cord segment 110 into a desired position, e.g., hide the media streaming device 102 from a view of the user, or change the position of the media streaming device 102 relative to the receiving device 104 to increase the RF performance of the media streaming device 102 and/or receiving device 104.

As a result, the radio frequency (RF) performance may be improved. For example, interference from the receiving device 104 on the wireless communication of the media streaming device 102 may be reduced. Also, by placing the media streaming device 102 a distance away from the receiving device 104, adjacent connector ports on the receiving device 104 are not blocked by the media streaming device 102. For example, the receiving device 104 may include multiple ports, and, conventionally, when a device is plugged directly into one of the ports, the device can block one or more adjacent ports such that other devices are prevented from using these adjacent ports.

FIG. 2 illustrates a media streaming device 202 configured to stream video content according to an implementation. In some examples, the media streaming device 202 may include one or more of the above-described features of the media streaming device 102 of FIG. 1. The media streaming device 202 may include a computer processing unit (CPU) 220 such as any type of general purpose computing circuitry or special purpose logic circuitry, e.g., an FPGA (field programmable gate array) or an ASIC (application specific integrated circuit), a graphics processing unit (GPU) 222, random-access memory (RAM) 224, storage 226, and a network interface 228 configured to wirelessly connect the media streaming device 202 with the media content source 106 over the network 150. The media streaming device 202 may include other components such as one or more batteries, connection interfaces, etc.

The media streaming device 202 may be coupled to a video output cord segment 210. The video output cord segment 210 may be an HDMI cord segment fixedly coupled to the media streaming device 202. In other examples, the video output cord segment 210 is removably coupled to the media streaming device 202. The video output cord segment 210 may include a first connector 207 (e.g., an HDMI connector) configured to be coupled to the receiving device 104 of FIG. 1, and a second connector 214 (e.g., a LVDS connector) configured to be coupled to the media streaming device 202. The media streaming device 202 may be removably coupled to a power cord segment 212. The power cord segment 212 may be a USB power cord segment having a first connector 209 to be removably coupled to the power source 108 of FIG. 1, and a second connector 215 configured to be removably coupled to the media streaming device 202. The first connector 209 may be a USB connector, a power plug adaptor, or a USB connector and a power plug adaptor. The second connector 215 may be a USB connector or a micro-USB connector.

FIG. 3 illustrates a media streaming device 302 configured to stream audio content according to an implementation. In some examples, the media streaming device 302 streams the audio content, but not the video content. The media streaming device 302 may be considered an audio streaming device, where networked audio content is seamlessly streamed to a wide variety of existing home speaker systems. In some examples, the media streaming device 302 may receive AC or DC power, provide audio output using a common plug format or set of formats, and supports wireless network connectors for control and streaming media data. The user may be able to control the media playback on the media streaming device 302 through one or more multiple other computing devices that can use control protocols. Also, the media streaming device 302 may provide a minimal user interface for resetting the device or initiating a setup mode, but the majority of the control and interaction may be driven by other devices that communicate with the media streaming device 302 wirelessly.

The media streaming device 302 may include a computer processing unit (CPU) 320 such as any type of general purpose computing circuitry or special purpose logic circuitry, e.g., an FPGA (field programmable gate array) or an ASIC (application specific integrated circuit), a memory 326, a network interface 328 configured to wireless connect the media streaming device 302 with the media content source 106 over the network 150, and an audio output circuit 330 configured to output the audio content to the receiving device 104. The memory 326 may include RAM and/or storage. The media streaming device 302 may include other components such as one or more batteries, connection interfaces, etc.

The media streaming device 302 may be coupled to an audio output cord segment 310. The audio output cord segment 310 may be fixedly coupled to the media streaming device 302. In other examples, the audio output cord segment 310 is removably coupled to the media streaming device 302. The audio output cord segment 310 may include a first connector 307 configured to be coupled to the receiving device 104 of FIG. 1, and a second connector 314 configured to be coupled to the media streaming device 302. The media streaming device 302 may be removably coupled to a power cord segment 312. The power cord segment 312 may be a USB power cord segment having a first connector 309 to be removably coupled to the power source 108 of FIG. 1, and a second connector 315 configured to be removably coupled to the media streaming device 302. The first connector 309 may be a USB connector, a power plug adaptor, or a USB connector and a power plug adaptor. The second connector 315 may be a USB connector or a micro-USB connector.

The audio output circuit 330 may be configured to detect which type of audio output cord segment 310 is coupled to the media streaming device 302. In some examples, the audio output circuit 330 may be configured to detect whether the connected audio output cord segment 310 is a digital-type cord or an analog-type cord. For example, the digital-type cord may be an optical audio cord such as TOSLINK, and the analog-type cord may be an RCA adaptor cord. Depending on the type of cord detected, the audio output circuit 330 is configured to format the audio content to have the appropriate format corresponding to the detected cord type. For example, when the audio output circuit 330 detects that the audio output cord segment 310 is the digital-type cord, the audio output circuit 330 formats the audio content to a digital format. When the audio output circuit 330 detects that the audio output cord segment 310 is the analog-type cord, the audio output circuit 330 formats the audio content to an analog format. In some examples, the audio output circuit 330 may transfer digital audio via optical interface, supply analog audio via a digital-to-analog converter, and/or supply the audio at various voltage levels to address various classes of audio rendering systems.

Figure 4:
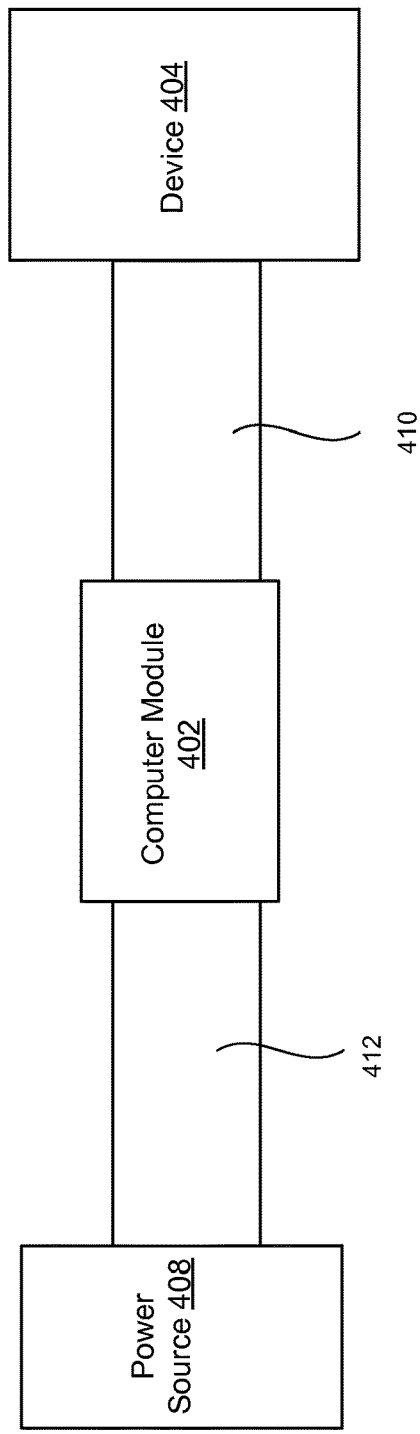
FIG. 4 illustrates a computer module configured to be coupled to a device via a first cord segment and a power source via a second cord segment such that the computer module converts the device into an application-specific computer according to an implementation.

FIG. 4 illustrates a computer module 402 configured to be coupled to a device 404 via a first cord segment 410 and a power source 408 via a second cord segment 412 such that the computer module 402 converts the device 404 into an application-specific computer according to an implementation. The first cord segment 410 may be any of the output cord segments described with reference to any of the figures. The second cord segment 412 may be any of the power cord segments described with reference to any of the figures. Also, the computer module 402 may include one or more of the components described with reference to the media streaming device (video or audio) of any of the figures.

However, more generally, the computer module 402 may include components and logic associated with a network-enabled computer such as one or more processors, a non-transitory computer-readable medium, one or more network interfaces, an operating system, and/or one or more applications. When coupled to the device 404, the computer module 402 converts the device 404 into an application-specific computer capable of connecting to the network 150. For example, the device 404 may be a lamp, and when the computer module 402 is coupled to the lamp via the first cord segment 410, the lamp is converted into a lamp-controlled computer configured to be manipulated and controlled in a manner that was not possible before. In other examples, the device 404 may be a microwave, and when the computer module 402 is coupled to the microwave via the first cord segment 410, the microwave is converted into a microwave-controlled computer configured to be manipulated and controlled in a manner that was not possible before. Beside the lamp and microwave examples, the device 404 may be any type of device that can be electrically-controlled.

In some examples, the computer module 402 is removably coupled to the first cord segment 410. In other examples, the computer module 402 is fixedly coupled to the first cord segment 410. In some examples, the computer module 402 is removably coupled to the second cord segment 412. In other examples, the computer module 402 is fixedly coupled to the second cord segment 412. In some examples, the second cord segment 412 is longer than the first cord segment 410. In other examples, the second cord segment 412 has the same length as the first cord segment 410. In some examples, the computer module 402 is smaller than a diameter of the first cord segment 410 and/or the second cord segment 412. In other examples, the computer module 402 is slightly larger than the first cord segment 410 and the second cord segment 412. In some examples, the first cord segment 410 and the second cord segment 412 appear as a continuation cord, and the computer module 402 appears to be integrated into the continuation cord.

Figure 5:
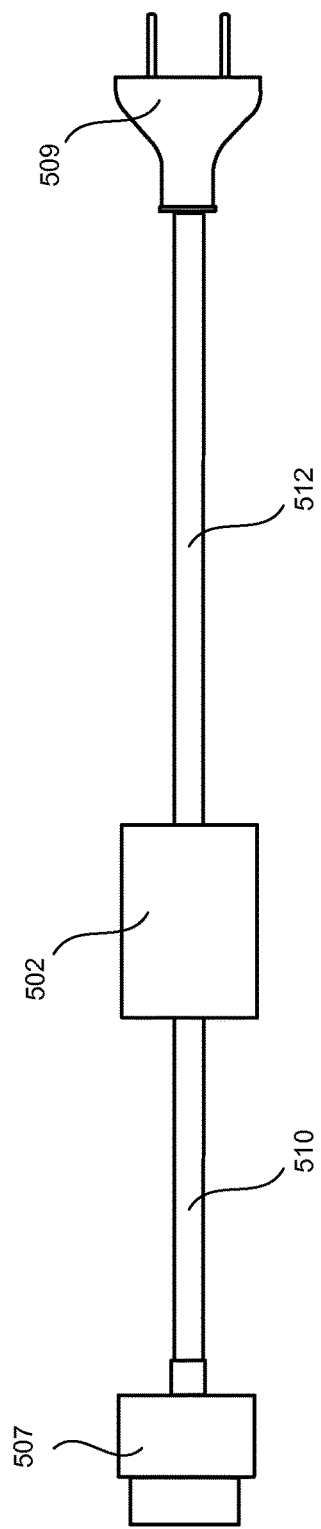
FIG. 5 illustrates a media streaming device fixedly coupled to a power cord segment and fixedly coupled to an output cord segment according to an implementation.

FIG. 5 illustrates a media streaming device 502 fixedly coupled to a power cord segment 512 and fixedly coupled to an output cord segment 510 according to an implementation. The media streaming device 502 may be any of the media streaming devices discussed with reference to any of the figures. Referring to FIG. 5, the power cord segment 512 may include a power cord adaptor 509 configured to be plugged into an AC wall socket, and the output cord segment 510 may include an HDMI connector 507 configured to be coupled to a receiving device.

Figure 6:
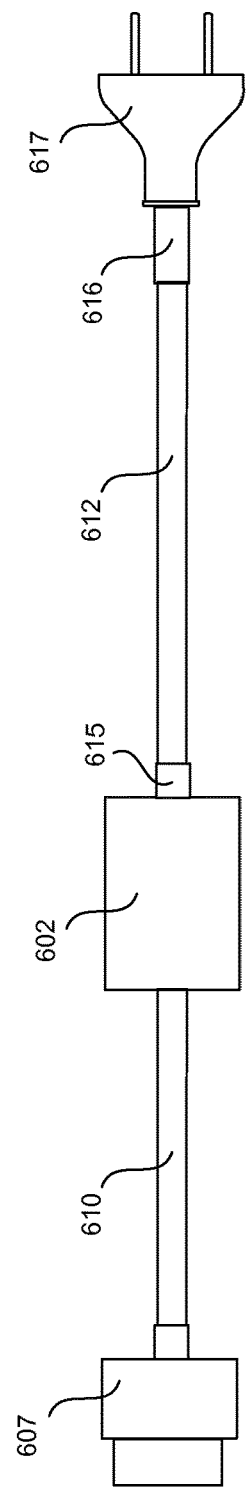
FIG. 6 illustrates a media streaming device removably coupled to a power cord segment and fixedly coupled to an output cord segment according to an implementation.

FIG. 6 illustrates a media streaming device 602 removably coupled to a power cord segment 612 and fixedly coupled to an output cord segment 610 according to an implementation. The media streaming device 602 may be any of the media streaming devices discussed with reference to any of the figures. Referring to FIG. 6, the power cord segment 612 may include a connector 615 (e.g., micro-USB connector) on one end portion of the power cord segment 612, a connector 616 (e.g., USB connector) on the other end portion of the power cord segment 612, and a power plug adaptor 617 configured to be removably coupled to the connector 616. The output cord segment 610 may include an HDMI connector 607 configured to be coupled to the receiving device 104.

FIG. 7 illustrates a media streaming device 702 coupled to an output cord segment 710 according to an implementation. Referring to FIGS. 1 and 7, the media streaming device 702 may be configured to stream media content, over the network 150, from the media content source 106 to the receiving device 104. In some examples, the media streaming device 702 is the media streaming device 102 of FIG. 2 or the media streaming device 202 of FIG. 2. The media streaming device 702 may be configured with wireless communication modules to communicate using Wi-Fi, Bluetooth (or other short-range protocols like Near Field Communication (NFC)), and cellular. The media streaming device 702 may be coupled to an output cord segment 710 having a HDMI connector 707. In some examples, the media streaming device 702 may be configured with a USB power scheme. For example, the media streaming device 702 may define a connector slot 730 configured to receive a USB connector of the power cord segment. In some examples, the connector slot 730 is a micro-USB connector slot configured to receive a micro-USB connector of the power cord segment. Also, the media streaming device 702 may include a reset button 729. When pressed, the reset button 729 is configured to start the reset of the media streaming device 702. The reset button 729 may be considered part of a minimal user interface for resetting the media streaming device 702 or initiating a setup mode. However, the majority of the control and interaction may be driven by other computing devices that communicate with it wirelessly.

The media streaming device 702 is relatively small and lightweight such that the media streaming device 702 can be suspended along the assembled streaming solution. Once assembled, the user may perceive the streaming solution (e.g., the media streaming device 702 with the output cord segment 710 and the power cord segment) as an integrated cable assembly (or continuous cord assembly) with a power plug on one end and the output on the other end. For instance, when the HDMI connector 707 is coupled to the receiving device 104 and the power cord segment is coupled to the media streaming device 702 and the power source 108, the media streaming device 702 is configured to be suspended at a distance away from the receiving device 104. The length of the output cord segment 710 may be designed such that it is short enough to remain relatively close to the receiving device 104 (e.g., potentially hidden from the user) but long enough to reduce one or more problems associated with plugging the media streaming device 702 directly into the receiving device's HDMI port.

In some examples, when coupled to the cord segments, the media streaming device 702 is suspended in air. In some examples, when coupled to the cord segments, the media streaming device 702 does not contact (or otherwise rest) on the ground or another object. Rather, the media streaming device 702 remains at a position away from the receiving device 104. In some examples, the media streaming device 702 is configured to hang from the HDMI port of the receiving device 104. In some examples, the media streaming device 702 is configured to hang from the HDMI port of the receiving device 104 at an angle. In some examples, when the streaming solution is assembled, the output cord segment 710 bends (thereby creating one or more bend portions) to a certain point such that the media streaming device 702 does not contact any portion of the receiving device 104.

As a result, the radio frequency (RF) performance may be improved. For example, interference from the receiving device 104 on the wireless communication of the media streaming device 702 may be reduced. Also, by placing the media streaming device 702 a distance away from the receiving device 104, adjacent HDMI ports on the receiving device 104 are not blocked by the media streaming device 702.

Furthermore, the output cord segment 710 may be flexible yet semi-rigid such that the output cord segment 710 can maintain a position. In some examples, the output cord segment 710 includes a bendable material, where the output cord segment 710 is configured to hold its shape (e.g., "Gumby" type material). As such, a user may be able to deform the output cord segment 710 into a desired position, e.g., hide the media streaming device 702 from a view of the user, or increase the RF performance of the media streaming device 702 and/or receiving device 104. In some examples, the output cord segment 710 includes a memory shape material such as a memory shape polymer. In some examples, the output cord segment 710 includes a memory shape metal wire. As such, the output cord segment 710 may be configured to deflect into a bent shape when suspended between the cord segments, but return to its original linear shape when disassembled from the receiving device 104.

In some examples, the media streaming device 702 may be substantially cylindrical having a diameter and a sidewall 731. In some examples, the media streaming device 702 may be mostly cylindrical with a diameter that can be defined by the distance from the center of the media streaming device 702 to a point on the outer perimeter. The diameter may be within a range of 45-55 millimeters (mm). In some examples, the diameter may be within a range of 48-53 mm. In some examples, the diameter may be approximately 51.8 mm. In some examples, the sidewall 731 may have a height within a range of 5-10 mm. In some examples, the height of the sidewall 731 may be approximately 7 mm. The above ranges and values for the diameter and the sidewall 731 of the media streaming device 702 may ensure that the media streaming device 702 is relatively compact (and lightweight) so that the media streaming device 702 can be suspended between the cord segments.

The output cord segment 710 may be fixedly coupled to the media streaming device 702. In some examples, the output cord segment 710 is not removable from the media streaming device 702 (e.g., without taking it apart and disassembling the media streaming device 702). In other words, a captive connection may be used between the output cord segment 710 and the media streaming device 702. In some examples, the length of the output cord segment 710 may be in the range of 90-120 mm (e.g., from the media streaming device 702 to the HDMI connector end). In some examples, the length of the output cord segment 710 may be in the range of 95-115 mm. In some examples, the length of the output cord segment 710 may be approximately 110 mm. The above ranges and values for the length of the output cord segment 710 may ensure that the media streaming device 702 remains relatively close to the receiving device (and/or suspended in air), but positioned a distance away from the receiving device 104 such that wireless interference caused by the receiving device 104 is reduced.

The output cord segment 710 may have a width that is wider than a width of any power cord segment. In some examples, the width of the output cord segment 710 is wider than any USB cord segment. In some examples, the output cord segment 710 is not cylindrical. Rather, the output cord segment 710 includes a first flat surface and a second flat surface that is opposite to the first flat surface.

FIG. 8 illustrates an exploded view of the media streaming device 702 according to an implementation. The media streaming device 702 may include a top enclosure assembly 734, a printed circuit board assembly 736, and a bottom enclosure assembly 738. The printed circuit board assembly 736 may be disposed between the top enclosure assembly 734 and the bottom enclosure assembly 738. As shown in FIG. 8, the output cord segment 710 may include the HDMI connector 707, and an LVDS connector 732. The LVDS connector 732 is configured to be coupled to the printed circuit board assembly 736. In some examples, the top enclosure assembly 734 and the bottom enclosure assembly 738 (when coupled together) are configured to enclose the LVDS connector 732, where only the cord portion extends from the outer structure of the media streaming device 702. The LVDS connector 732 may have a size larger than a size of the cord portion of the output cord segment 710, but the LVDS connector 732 may reside inside the overall housing structure defined by the top enclosure assembly 734 and the bottom enclosure assembly 738. In some examples, the top enclosure assembly 734 is coupled to the bottom enclosure assembly 738 using an interference fit. In some examples, the top enclosure assembly 734 is fused with the bottom enclosure assembly 738 using ultrasonic welding (e.g., two plastic parts are fused together to make a bond). In some examples, the top enclosure assembly 734 is coupled to the bottom enclosure assembly 738 using one or more fasteners. In some examples, the output cord segment 710 is coupled to the bottom enclosure assembly 738 and the printed circuit board assembly 736 with fasteners such as screws.

The bottom enclosure assembly 738 may have a cupped-shaped structure configured to receive the printed circuit board assembly 736. In some examples, the bottom enclosure assembly 738 is configured to enclose most of the printed circuit board assembly 736 (or the printed circuit board assembly 736 in its entirety). Within the recess of the bottom enclosure assembly 738, the bottom enclosure assembly 738 may also include a thermal adhesive, a heat spreader, a thermal pad or gel, and a shield. The printed circuit board assembly 736 may include a plurality of integrated chips coupled to a substrate (and/or both sides of the substrate) and one or more shields to protect the integrated chips. The top enclosure assembly 734 may have a disc-shaped structure configured to be coupled to the bottom enclosure assembly 738. In some examples, the top enclosure assembly 734 may include or otherwise be coupled to a first thermal gel, a heat spreader, and a second thermal pad or gel.

FIG. 9A illustrates an external surface 740 of the top enclosure assembly 734 of the media streaming device 702 according to an implementation. FIG. 9B illustrates an internal surface 742 of the top enclosure assembly 734 of the media streaming device 702 according to an implementation. The external surface 740 may be the surface visible to the user, and the internal surface 742 may be the surface facing the printed circuit board assembly 736. In some examples, the top enclosure assembly 734 may have a cylindrical shape with a sidewall 741 (e.g., the sidewall 741 may define the depth of the cylinder). In some examples, the length of the sidewall 741 may be less than the sidewall of the bottom enclosure assembly 738. The top enclosure assembly 734 may have a diameter that is the same (or substantially the same) as the diameter of the bottom enclosure assembly 738. Referring to FIG. 9B, the internal surface 742 of the top enclosure assembly 734 may define a pair of heat stake components 744.

FIG. 10A illustrates an external surface 746 of the bottom enclosure assembly 738 of the media streaming device 702 according to an implementation. FIG. 10B illustrates an internal surface 748 of the bottom enclosure assembly 738 of the media streaming device 702 according to an implementation. The external surface 740 may be the surface visible to the user, and the internal surface 742 may be the surface facing the printed circuit board assembly 736. In some examples, the bottom enclosure assembly 738 may have a cylindrical shape with a sidewall 745 (e.g., the sidewall 745 may define the depth of the cylinder). In some examples, the length of the sidewall 745 may be greater than the sidewall 741 of the top enclosure assembly 734. The bottom enclosure assembly 738 may have a diameter that is the same (or substantially the same) as the diameter of the top enclosure assembly 734.

Referring to FIG. 10A, the bottom enclosure assembly 738 may define the connector slot 730 configured to receive a USB connector of the power cord segment. In some examples, the connector slot 730 is a micro-USB connector slot configured to receive a micro-USB connector of the power cord segment. Also, the bottom enclosure assembly 738 may define a reset slot 733 configured to expose the reset button 729. Further, the bottom enclosure assembly 738 may define an LVDS connector slot 747. The LVDS connector slot 747 may be the opening in which the output cord segment 710 extends from the bottom enclosure assembly 738. The LVDS connector slot 747 may capture the HDMI cable along the cable section. In some examples, the LVDS connector 732 is inboard of the LVDS connector slot 747. In cases where the cable is not fixed, a female HDMI receptacle (or variant) may be disposed in the LVDS connector slot 747. Referring to FIG. 10B, a pair of alignment pins 750 may be coupled to the internal surface 748 of the bottom enclosure assembly 738. In some examples, more than two alignment pins 750 may be used. The printed circuit board assembly 736 may define corresponding holes (e.g., holes 754 on FIG. 11A) on the substrate. The holes are configured to receive the alignment pins 750 such that the printed circuit board assembly 736 is aligned in the correct manner with respect to the bottom enclosure assembly 738. Also, a heat spreader 752 may be coupled to the internal surface 748 of the bottom enclosure assembly 738.

FIG. 11A illustrates the printed circuit board assembly 736 disassembled from the bottom enclosure assembly 738 according to an implementation. FIG. 11B illustrates the printed circuit board assembly 736 assembled with the bottom enclosure assembly 738 according to an implementation. Referring to FIGS. 11A-11B, the printed circuit board assembly 736 is coupled to the LVDS connector 732 of the output cord segment 710. The other end of the output cord segment 710 defines the HDMI connector 707. The printed circuit board assembly 736 may be properly aligned with the bottom enclosure assembly 738 by aligning the alignment pins 750 with the holes 754 on the printed circuit board assembly 736. As shown in FIG. 11B, the printed circuit board assembly 736 is configured to fit within the bottom enclosure assembly 738 such that the LVDS connector 732 is contained within the bottom enclosure assembly 738.

FIGS. 12A-12B illustrate one side of the printed circuit board assembly 736 according to an implementation. The printed circuit board assembly 736 may include a two-layer shield (e.g., internal frame+cover shield) configured to protect the integrated circuits (or IC chips) of the printed circuit board assembly 736. FIG. 12A illustrates a top side 761 of the printed circuit board assembly 736 depicting one layer (internal frame 760) of the two-layer shield according to an implementation. FIG. 12B illustrates the top side 761 of the printed circuit board assembly 736 depicting the other layer (a cover shield 769) of the two-layer shield according to an implementation. The top side 761 may be considered one surface of the printed circuit board assembly 736. The top side 761 may be considered the surface of the printed circuit board assembly 736 facing the top enclosure assembly 734.

Referring to FIG. 12A, the top side 761 of the printed circuit board assembly 736 may include a plurality of integrated circuits coupled to a substrate including a system on chip (SOC) 764, a wireless communication chip 766, and one or more power management integrated circuits (PMICs) 768. In some examples, the wireless communication chip 766 may provide the logic for the Wi-Fi capabilities of the media streaming device 702. The internal frame 760 may be coupled to the printed circuit board assembly 736. The internal frame 760 may be a metal structure configured to surround the plurality of integrated circuits, and one or more walls that extend within the metal structure in order to separate one or more integrated circuits from other integrated circuits. For example, the internal frame 760 may include a shield wall 763 configured to separate the SOC 764 and the wireless communication chip 766.

Referring to FIG. 12B, the cover shield 769 may be coupled to the internal frame 760 such that the integrated circuits are covered and protected by the two-layer shield defined by the internal frame 760 and the cover shield 769. In some examples, the cover shield 769 may include a metal cover that is configured to be coupled to the internal frame 762. The internal frame 760 and the cover shield 769 may form two or more separate metal enclosures configured to enclose and separate one or more integrated circuits from other integrated circuits.

FIG. 13A-13B illustrates the other side of the printed circuit board assembly 736 according to an implementation. For instance, the printed circuit board assembly 736 may include another two-layer shield (e.g., internal frame+cover shield) configured to protect the integrated circuits of a bottom side 770 of the printed circuit board assembly 736. FIG. 13A illustrates a bottom side 770 of the printed circuit board assembly 736 depicting one layer (internal frame 776) of the two-layer shield according to an implementation. FIG. 13B illustrates the bottom side 770 of the printed circuit board assembly 736 depicting the other layer (cover shield 778) of the two-layer shield according to an implementation. The bottom side 770 may be considered one surface of the printed circuit board assembly 736. The bottom side 770 may be opposite to the top side 761 of FIGS. 12A-12B. The bottom side 770 may be considered the surface of the printed circuit board assembly 736 facing the bottom enclosure assembly 738.

Referring to FIG. 13A, the bottom side 770 of the printed circuit board assembly 736 may include a plurality of integrated circuits coupled to the substrate including dynamic random access memory (DRAM) chips 772, flash memory (NAND) 774, and PMICs 779. The internal frame 776 may be coupled to the bottom side 770 of the printed circuit board assembly 736 such that a perimeter of the internal frame 776 surrounds the integrated circuits. The internal frame 776 may be a metal structure configured to surround the plurality of integrated circuits. In some examples, the internal frame 776 may be a wall structure configured to provide support for the cover shield 778. The internal frame 776 may include a shield wall 777 configured to separate the memory components (e.g., DRAM chips 772, the flash memory 774) from the other components such as the PMICs 779.

Referring to FIG. 13B, the cover shield 778 may be coupled to the internal frame 776 such that the integrated circuits are covered and protected by the two-layer shield defined by the internal frame 776 and the cover shield 778. In some examples, the cover shield 778 may include a metal cover that is configured to be coupled to the internal frame 776. The internal frame 776 and the cover shield 778 may form two or more separate metal enclosures configured to enclose and separate one or more integrated circuits from other integrated circuits.

FIG. 14A illustrates the output cord segment 710 having the HDMI connector 707 on one end portion of the output cord segment 710 and the LVDS connector 732 on the other end of the output cord segment 710 according to an implementation. The LVDS connector 732 may define a lip 785 configured to engage with the bottom enclosure assembly 738 that defines the LVDS connector slot 747. The lip's engagement with the bottom enclosure assembly 738 ensures that the LVDS connector 732 will not become detached from the printed circuit board assembly 736. FIG. 14B illustrates an exploded view of the LVDS connector 732 according to an implementation. Referring to FIG. 14B, the LVDS connector 732 may include a shield shell top 780, an LVDS plug 782, an LVDS receptacle 784 coupled to a substrate 786, and a shield shell bottom 788.

Figure 15A:
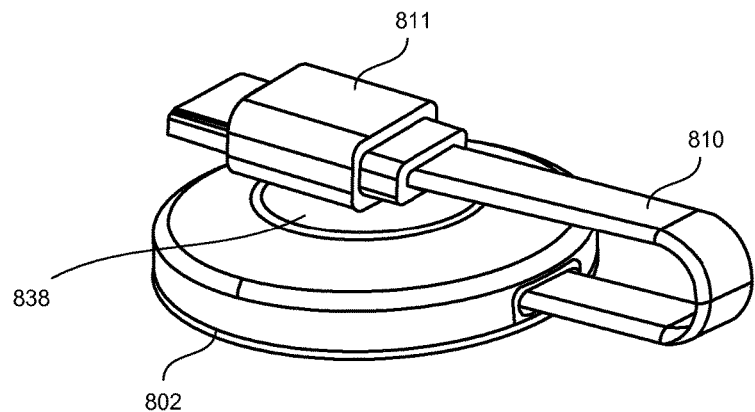
FIG. 15A illustrates a perspective of a media streaming device in a folded configuration according to an implementation.
Figure 15B:
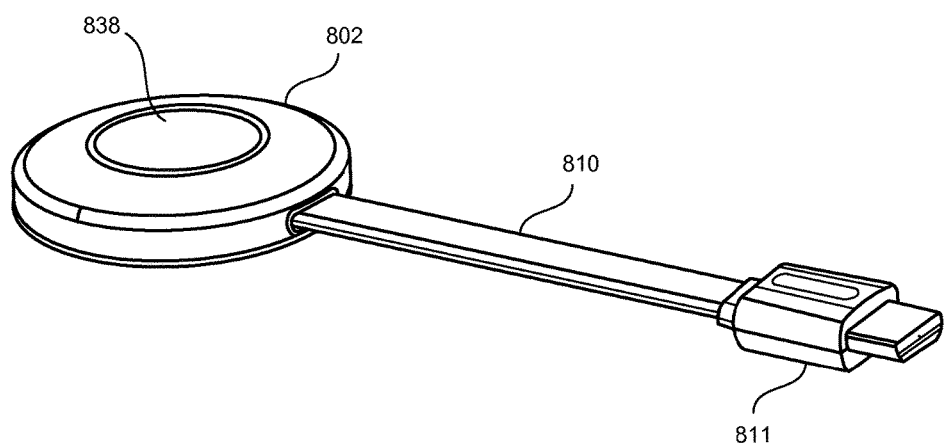
FIG. 15B illustrates a perspective of the media streaming device in an unfolded configuration according to an implementation.
Figure 15C:
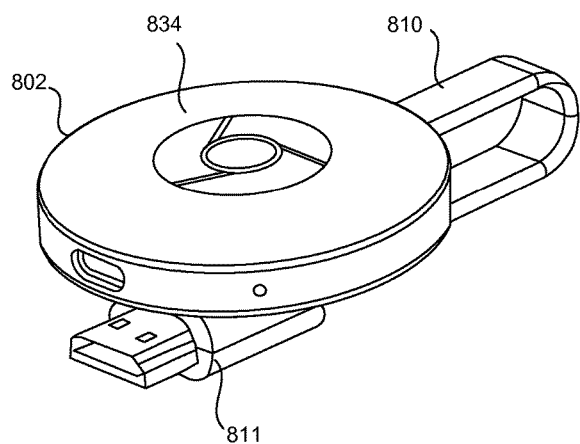
FIG. 15C illustrates another perspective of the media streaming device in the folded configuration according to an implementation.
Figure 15D:
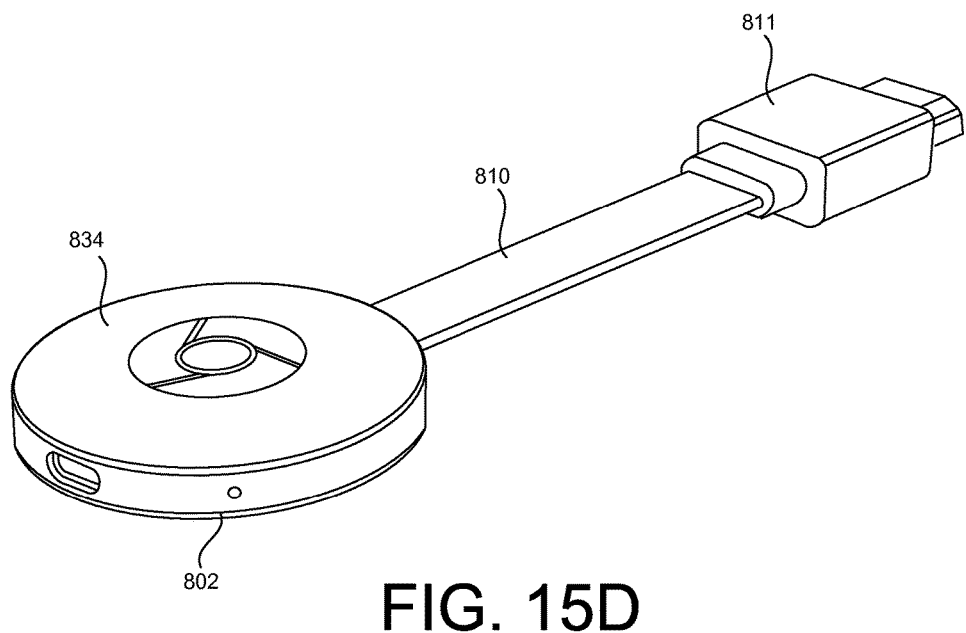
FIG. 15D illustrates another perspective of the media streaming device in the unfolded configuration according to an implementation

FIG. 15A illustrates a perspective of a media streaming device 802 in a folded configuration according to an implementation. FIG. 15B illustrates a perspective of the media streaming device 802 in an unfolded configuration according to an implementation. FIG. 15C illustrates another perspective of the media streaming device 802 in the folded configuration according to an implementation. FIG. 15D illustrates another perspective of the media streaming device 802 in the unfolded configuration according to an implementation.

Referring to FIGS. 15A-15D, the media streaming device 802 includes an output cord segment 810 coupled to the media streaming device 802, where the output cord segment 810 includes an HDMI cable end portion 811. The media streaming device 802 includes a bottom enclosure assembly 838 and a top enclosure assembly 834. Referring to FIGS. 15A and 15C, in the folded configuration, the HDMI cable end portion 811 of the output cord segment 810 is coupled to the bottom enclosure assembly 838 of the media streaming device 802. In some examples, the folded configuration is achieved by magnetic attraction between a magnet disposed within the HDMI cable end portion 811 and an internal metal heat spreader within the bottom enclosure assembly 838. Referring to FIGS. 15B and 15D, the HDMI cable end portion 811 is uncoupled to the bottom enclosure assembly 838 of the output cord segment 810. In some examples, the output cord segment 810 is biased to the unfolded configuration. In some examples, the unfolded configuration is a linear configuration.

Figure 16:
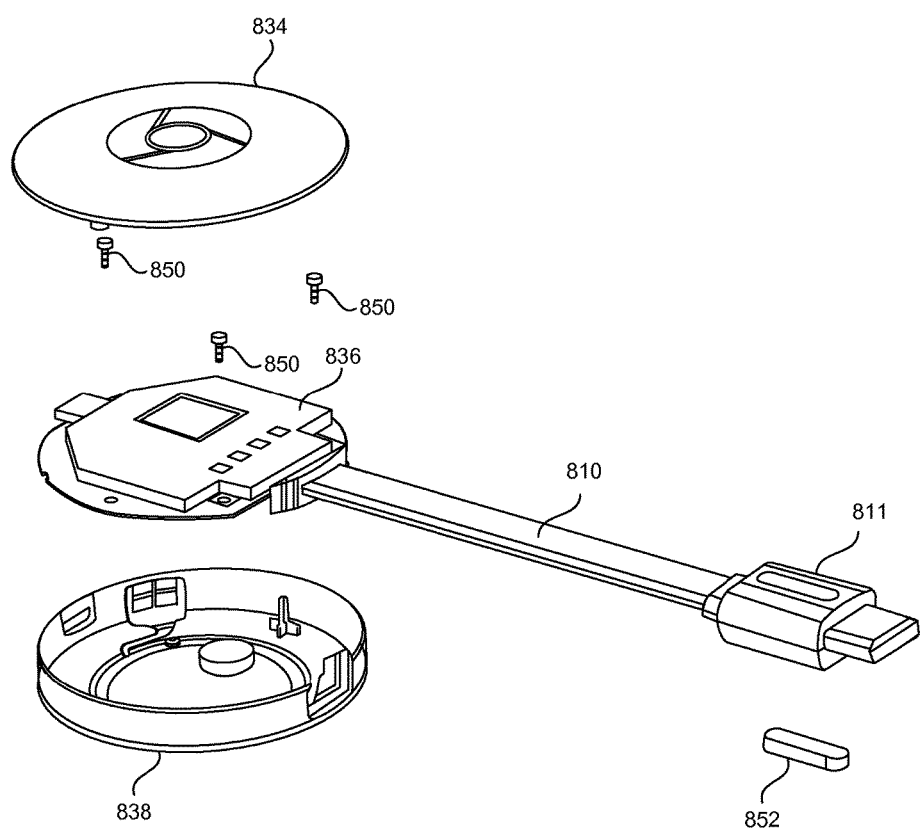
FIG. 16 illustrates an exploded view of the media streaming device according to an implementation.

FIG. 16 illustrates an exploded view of the media streaming device 802 according to an implementation. Referring to FIG. 16, the media streaming device 802 includes the top enclosure assembly 834, the bottom enclosure assembly 838, and a printed circuit board assembly 836 to be enclosed by the top enclosure assembly 834 and the bottom enclosure assembly 838. The HDMI cable end portion 811 of the output cord segment 810 may include a magnet 852. For example, the magnet 852 may be disposed within a structure of the HDMI cable end portion 811. The top enclosure assembly 834 may be coupled to the bottom enclosure assembly 838 via thread forming fasteners 850.

Figure 17:
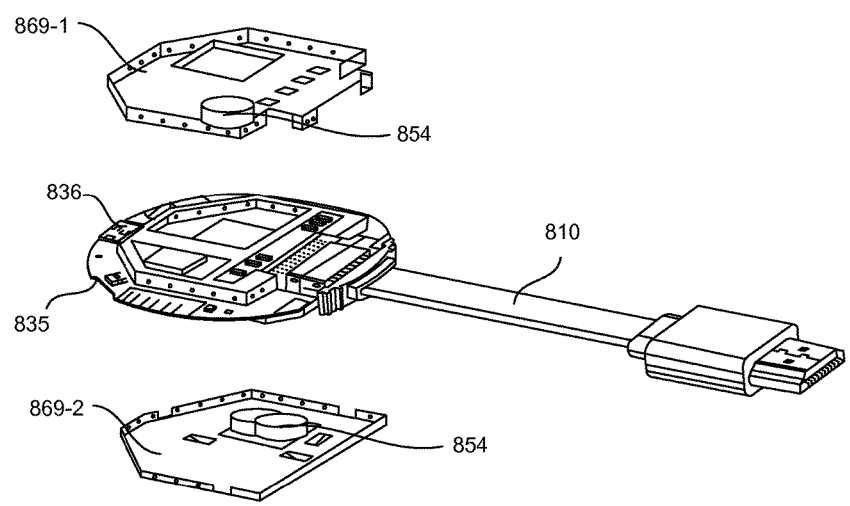
FIG. 17 illustrates a partially exploded view of the printed circuit board assembly according to another implementation.

FIG. 17 illustrates a partially exploded view of the printed circuit board assembly 836 according to another implementation. A first shield can 869-1 may be coupled to one surface of a substrate 835 of the printed circuit board assembly 836, and a second shield can 869-2 may be coupled to the other surface of the substrate 835 of the printed circuit board assembly 836. The substrate 835 may be any type of substrate capable of having mounted integrated circuits. In some examples, the substrate 835 is substantially circular. The first shield can 869-1 and the second shield can 869-2 may protect the circuit components on both sides of the printed circuit board assembly 836. Also, one or more thermal gels 854 may be coupled to the first shield can 869-1 and the second shield can 869-2.

Figure 18A:
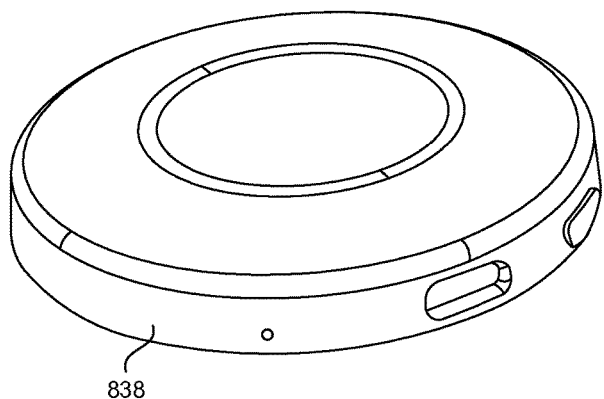
FIG. 18A illustrates a perspective of the bottom enclosure assembly according to an implementation.
Figure 18B:
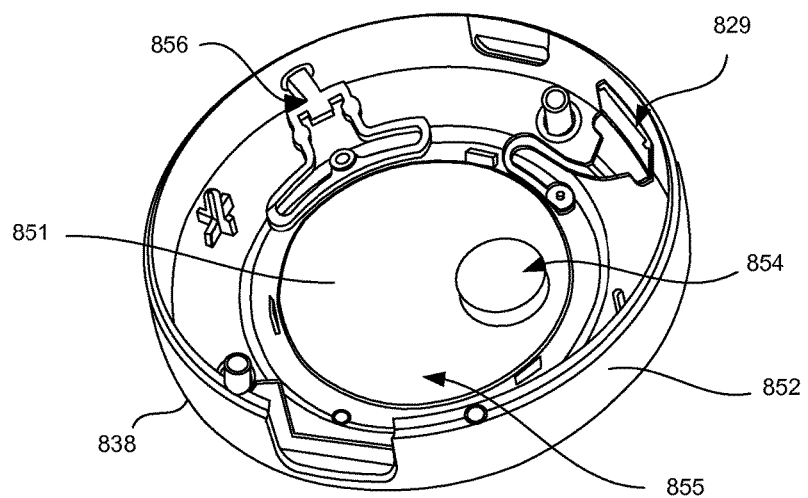
FIG. 18B illustrates another perspective of the bottom enclosure assembly according to another implementation.

FIG. 18A illustrates an external view of the bottom enclosure assembly 838 according to an implementation. FIG. 18B illustrates an internal view of the bottom enclosure assembly 838 according to another implementation. Referring to FIGS. 18A and 18B, the bottom enclosure assembly 838 may include a metal (e.g., steel) heat spreader 855 coupled to an internal surface 851 of the bottom enclosure assembly 838. The heat spreader 855 may interact with the magnet 852 on the HDMI cable end portion 811 when in the folded configuration as shown in FIGS. 15A and 15C. Also, the bottom enclosure assembly 838 may include a thermal gel 854 coupled to the heat spreader 855. In addition, a reset button 829 may be coupled to the bottom enclosure assembly 838 in order to allow a user to reset the media streaming device 802. For example, the reset button 829 may protrude through an opening on a sidewall 852 of the bottom enclosure assembly 838, and may be operatively coupled to the printed circuit board assembly 836 when the components of the media streaming device 802 are assembled together. In addition, a light pipe 856 may be coupled the bottom enclosure assembly 838 in order to allow a user to view light transmitted from the media streaming device 802. For example, activation of the light via the light pipe 856 may indicate an operating status of the media streaming device 802. The light pipe 856 may protrude through an opening on the sidewall 852 of the bottom enclosure assembly 838, and may be operatively coupled to the printed circuit board assembly 836 when the components of the media streaming device 802 are assembled together.

Figure 19A:
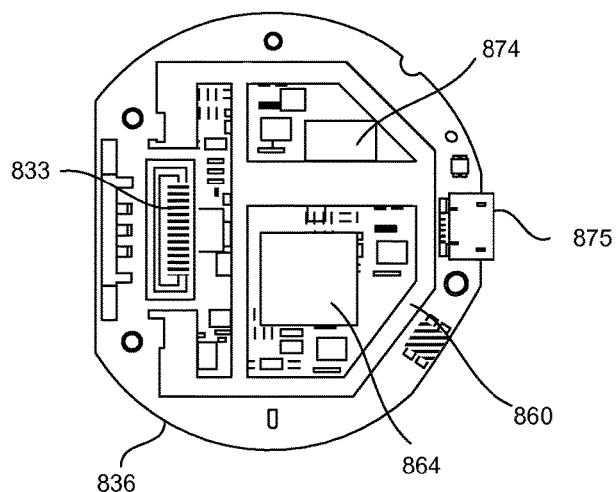
FIG. 19A illustrates a top view of the printed circuit board assembly according to an implementation.
Figure 19B:
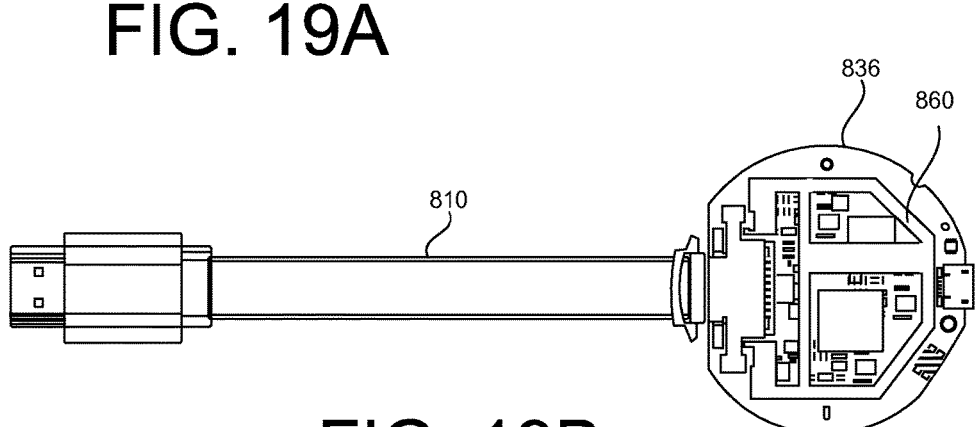
FIG. 19B illustrates the output cord segment coupled to the printed circuit board assembly without the shield can according to an implementation.
Figure 19C:
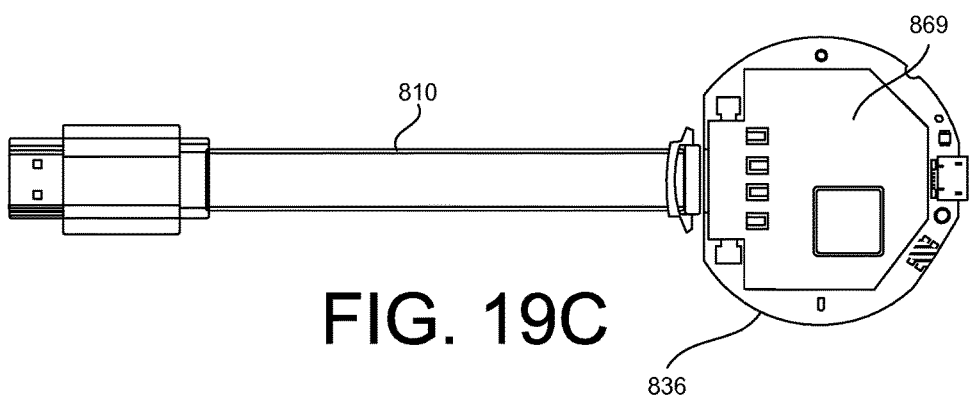
FIG. 19C illustrates the output cord segment coupled to the printed circuit board assembly with the shield can according to an implementation.

FIG. 19A illustrates a top view of the printed circuit board assembly 836 according to an implementation. FIG. 19B illustrates the output cord segment 810 coupled to the printed circuit board assembly 836 without the shield can 869 according to an implementation. FIG. 19C illustrates the output cord segment 110 coupled to the printed circuit board assembly 836 with the shield can 869 according to an implementation. The printed circuit board assembly 836 may include an LVDS board connector 833 configured to be coupled to the LVDS connector of the output cord segment 810. Also, the printed circuit board assembly 836 may include an internal frame 860. The internal frame 860 may be a metal structure configured to surround the plurality of integrated circuits, and one or more walls that extend within the metal structure in order to separate one or more integrated circuits from other integrated circuits. In some examples, the printed circuit board assembly 836 may include a NAND flash 874, and system on chip (SOC) 864. Also, the printed circuit board assembly 836 may include a micro-USB connector 875 configured to be coupled to a micro-USB connector on the power cord segment. Referring to FIG. 19C, the shield can 869 may be disposed on and surround the internal frame 860 in order to protect the NAND flash 874 and the SOC 864, as well as other circuit components.

Figure 20B:
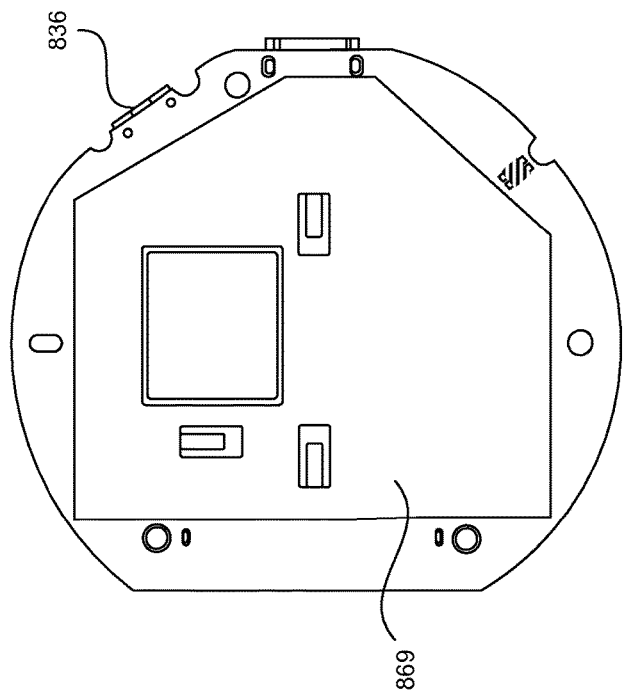
FIG. 20B illustrates a bottom view of the printed circuit board assembly with the shield can according to an implementation.
Figure 20A:
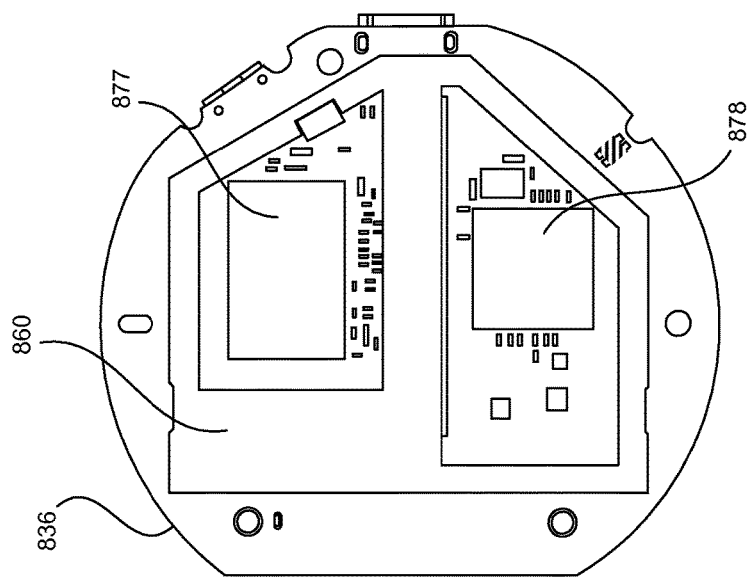
FIG. 20A illustrates a bottom view of the printed circuit board assembly without the shield can according to an implementation.

FIG. 20A illustrates a bottom view of the printed circuit board assembly 836 without the shield can 869 according to an implementation. FIG. 20B illustrates a bottom view of the printed circuit board assembly 836 with the shield can 869 according to an implementation. The printed circuit board assembly 836 may include a DDR memory 877 and a WiFi chip 878. The printed circuit board assembly 836 may include an internal frame 860 configured to surround and separate the DDR memory 877 and the WiFi chip 878. The shield can 869 may be disposed on and surround the internal frame 860 in order to protect the DDR memory 877 and the WiFi chip 878, as well as other circuit components, on the other side of the printed circuit board assembly 836.

Figure 21:
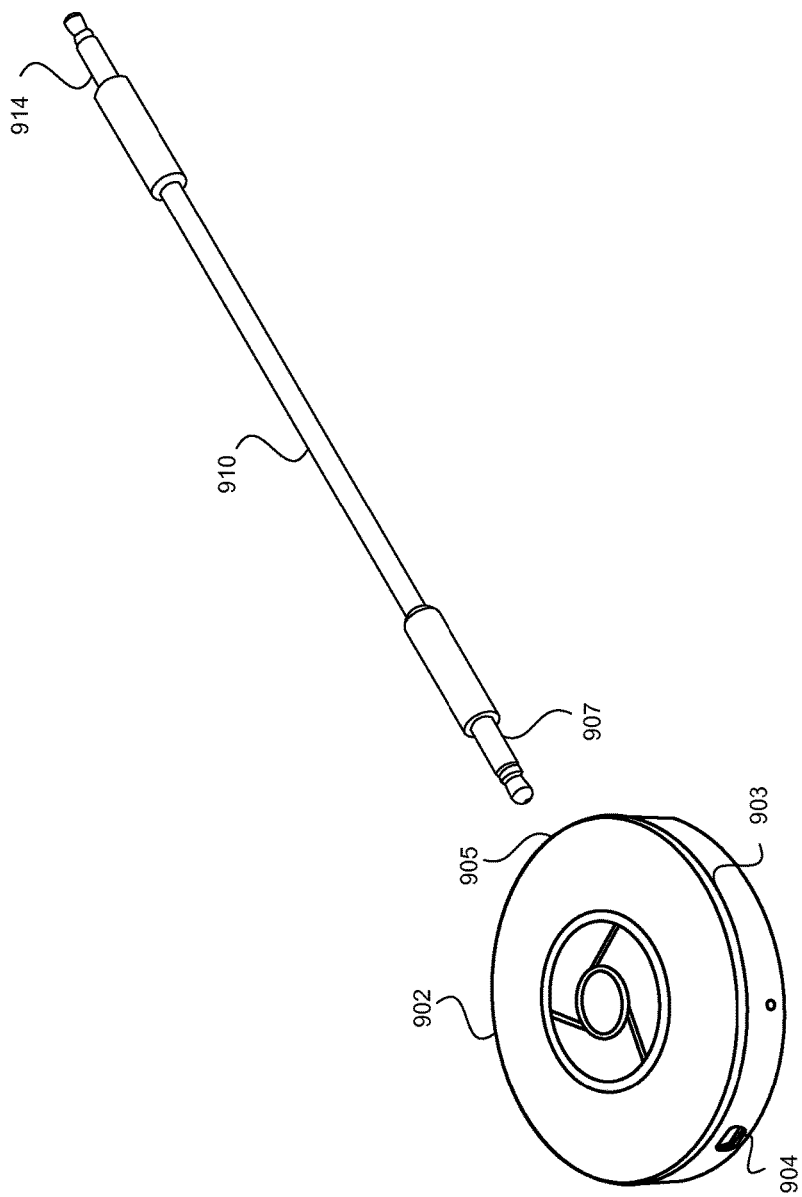
FIG. 21 illustrates an audio streaming device configured to stream audio content according to an implementation.

FIG. 21 illustrates an audio streaming device 902 configured to stream audio content according to an implementation. In some examples, the audio streaming device 902 streams the audio content, but not the video content. The audio streaming device 902 may seamlessly stream networked audio content to a wide variety of existing home speaker systems (e.g., one or more receiving devices 104). In some examples, the audio streaming device 902 may receive AC or DC power, provide audio output using a common plug format or set of formats, and support wireless network connections for control and streaming media data. The user may be able to control the media playback on the audio streaming device 902 through one or more multiple other computing devices that can use control protocols. Also, the audio streaming device 902 may provide a minimal user interface for resetting the device or initiating a setup mode, but the majority of the control and interaction may be driven by other devices that communicate with the audio streaming device 902 wirelessly.

The audio streaming device 902 may include a housing 903 configured to support and enclose a computer processing unit (CPU) 320 such as any type of general purpose computing circuitry or special purpose logic circuitry configured to wireless connect the audio streaming device 902 with a media content source 106. In some examples, the housing 903 may include a cylindrical or puck shape design. In some examples, the housing 903 may be any of the structures described with reference to the previous figures. The housing 903 may define a micro-USB connector slot 906 configured to receive a micro-USB connector of a power cord segment. Also, the audio streaming device 902 may include an audio jack 905 configured to receive an audio output cord segment 910. The audio jack 905 may be optical and analog audio jack. The audio output cord segment 910 may be a digital-type cord. In some examples, the audio output cord segment 910 may be an analog-type cord.

The audio streaming device 902 may be removably coupled to the audio output cord segment 910. In other examples, the audio output cord segment 910 may be fixedly coupled to the audio streaming device 902. The audio output cord segment 910 may include a first connector 907 configured to be inserted and coupled to the audio jack 905 on the audio streaming device 902, and a second connector 914 configured to be coupled to a receiving device (e.g., the receiving device 104 of FIG. 1). In some examples, the audio streaming device 902 includes features from the media streaming device 302 of FIG. 3 (e.g., the CPU 320, the memory 326, the network interface 128, and the audio output circuit 330).

Figure 22:
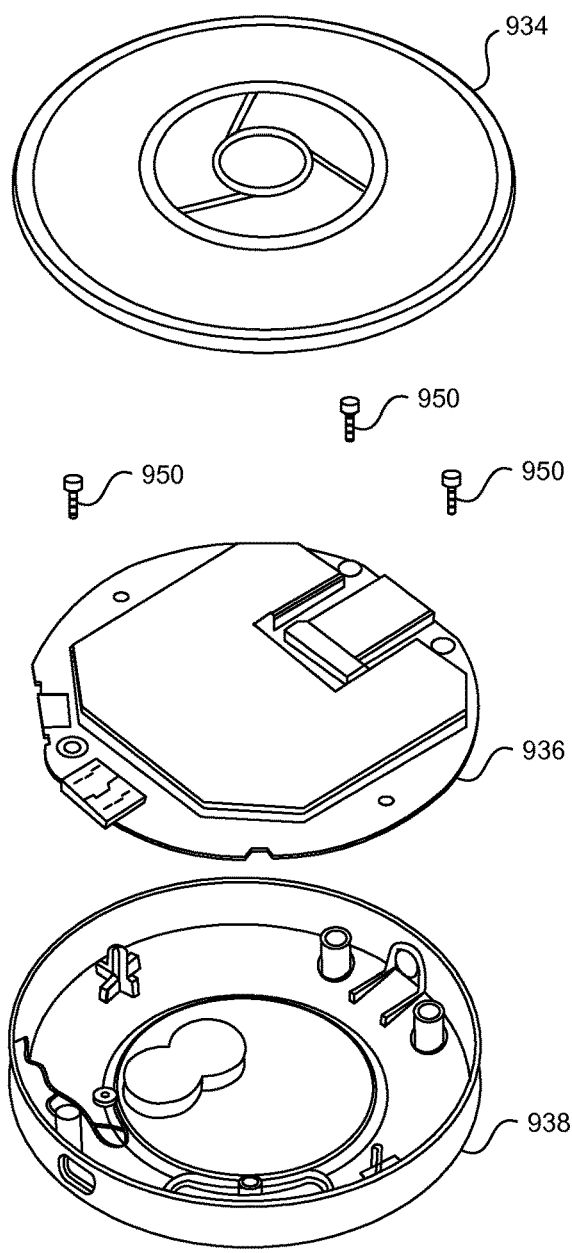
FIG. 22 illustrates an exploded view of the audio streaming device according to an implementation.

FIG. 22 illustrates an exploded view of the audio streaming device 902 according to an implementation. The audio streaming device 902 may include a top enclosure assembly 934, a printed circuit board assembly 936 and a bottom enclosure assembly 938. The top enclosure assembly 934 may be coupled to the bottom enclosure assembly 938 via thread forming fasteners 850 such that the printed circuit board assembly 936 is disposed within the top enclosure assembly 934 and the bottom enclosure assembly 938.

Figure 23B:
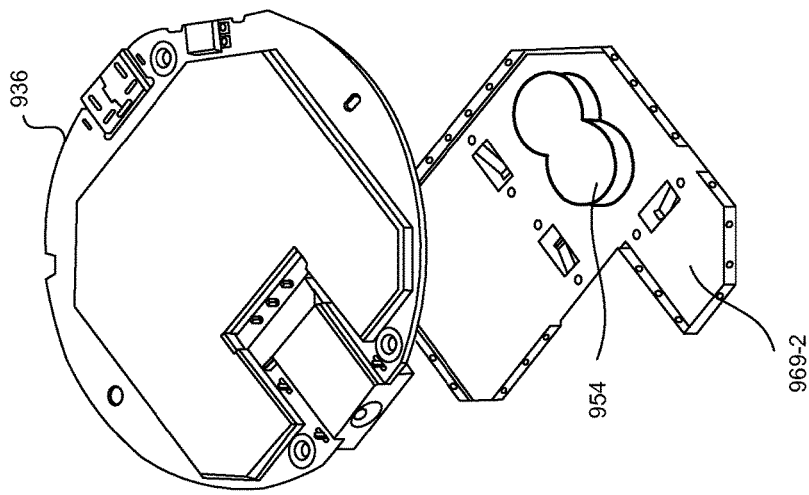
FIG. 23B illustrates a bottom view of the printed circuit board assembly according to an implementation.
Figure 23A:
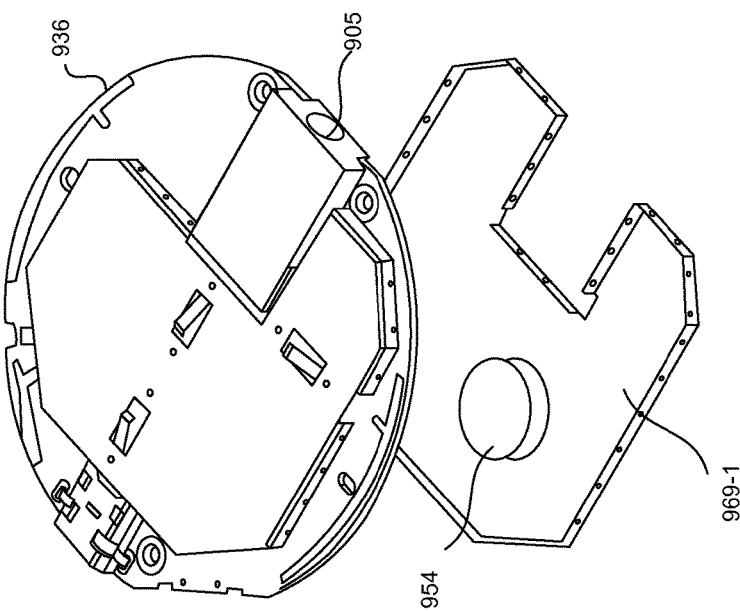
FIG. 23A illustrates a top view of the printed circuit board assembly according to an implementation.

FIG. 23A illustrates a top view of the printed circuit board assembly 936 according to an implementation. FIG. 23B illustrates a bottom view of the printed circuit board assembly 936 according to an implementation. A first shield can 969-1 may be coupled to one surface of the printed circuit board assembly 936, and a second shield can 969-2 may be coupled to the other surface of the printed circuit board assembly 936. The first shield can 969-1 and the second shield can 969-2 may protect the circuit components on both sides of the printed circuit board assembly 936. Also, one or more thermal gels 954 may be coupled to the first shield can 869-1 and the second shield can 869-2.

FIG. 24A illustrates an external view of the bottom enclosure assembly 938 according to an implementation. FIG. 24B illustrates an internal view of the bottom enclosure assembly 938 according to another implementation. Referring to FIGS. 24A and 24B, the bottom enclosure assembly 938 may include a metal (e.g., steel) heat spreader 955 coupled to an internal surface of the bottom enclosure assembly 938. Also, the bottom enclosure assembly 938 may include a thermal gel 954 coupled to the heat spreader 955. In addition, a reset button 929 may be coupled to the bottom enclosure assembly 938 in order to allow a user to reset the audio streaming device 902. For example, the reset button 929 may protrude through an opening on a sidewall of the bottom enclosure assembly 938, and may be operatively coupled to the printed circuit board assembly 936 when the components of the audio streaming device 902 are assembled together. In addition, a light pipe 956 may be coupled the bottom enclosure assembly 938 in order to allow a user to view light transmitted from the audio streaming device 902. For example, activation of the light via the light pipe 956 may indicate an operating status of the audio streaming device 902. The light pipe 956 may protrude through an opening on the sidewall of the bottom enclosure assembly 938, and may be operatively coupled to the printed circuit board assembly 936 when the components of the audio streaming device 902 are assembled together.

Figure 25A:
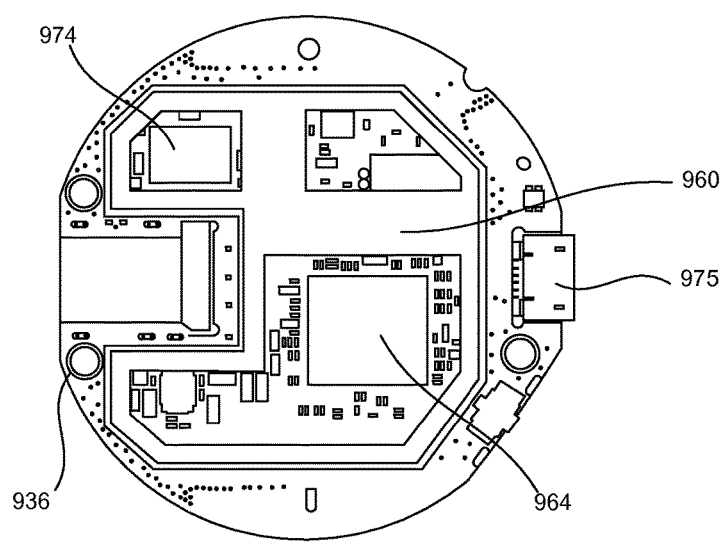
FIG. 25A illustrates a top view of the printed circuit board assembly without a shield can according to an implementation.
Figure 25B:
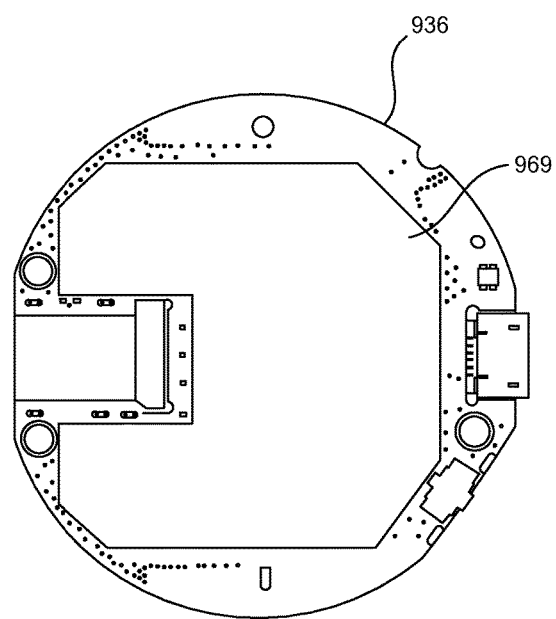
FIG. 25B illustrates a top view of the printed circuit board assembly with the shield can according to an implementation.

FIG. 25A illustrates a top view of the printed circuit board assembly 936 without a shield can 969 according to an implementation. FIG. 25B illustrates a top view of the printed circuit board assembly 936 with the shield can 969 according to an implementation. The printed circuit board assembly 936 may include an internal frame 960. The internal frame 960 may be a metal structure configured to surround the plurality of integrated circuits, and one or more walls that extend within the metal structure in order to separate one or more integrated circuits from other integrated circuits. In some examples, the printed circuit board assembly 936 may include a NAND flash 974, and system on chip (SOC) 964 coupled to a substrate of the printed circuit board assembly 936. Also, the printed circuit board assembly 836 may include a micro-USB connector 975 configured to be coupled to a micro-USB connector on the power cord segment. The shield can 969 may be disposed on and surround the internal frame 960 in order to protect the NAND flash 974 and the SOC 964, as well as other circuit components, on one side of the printed circuit board assembly 936.

Figure 26A:
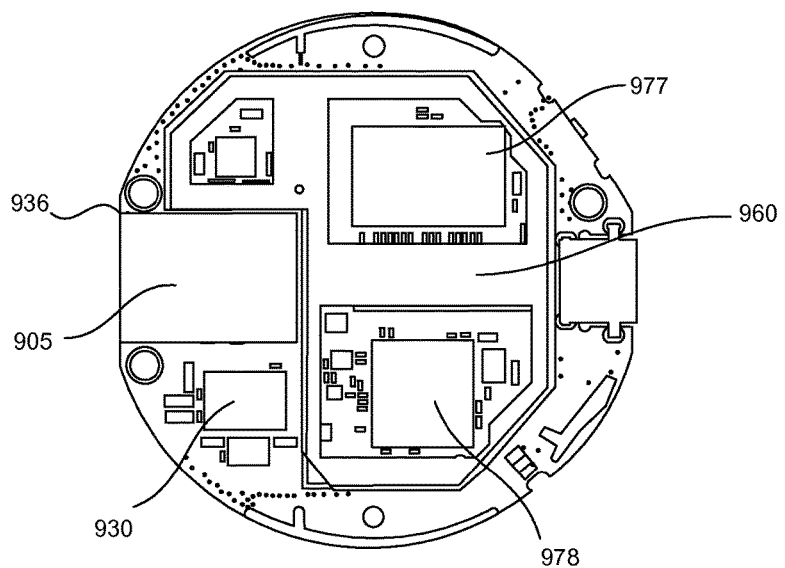
FIG. 26A illustrates a bottom view of the printed circuit board assembly without the shield can according to an implementation.
Figure 26B:
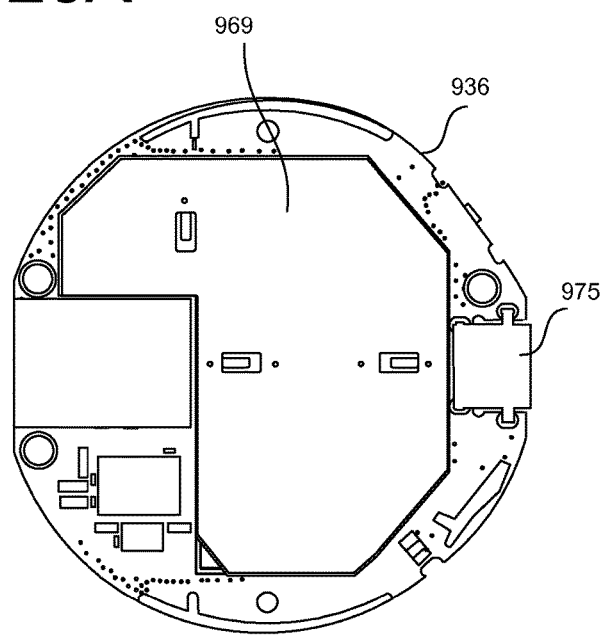
FIG. 26B illustrates a bottom view of the printed circuit board assembly with the shield can according to an implementation.

FIG. 26A illustrates a bottom view of the printed circuit board assembly 936 without the shield can 969 according to an implementation. FIG. 26B illustrates a bottom view of the printed circuit board assembly 936 with the shield can 969 according to an implementation. The printed circuit board assembly 936 may include a DDR memory 977 and a WiFi chip 978 disposed on a substrate of the printed circuit board assembly 936. The printed circuit board assembly 936 may include an internal frame 960 configured to surround and separate the DDR memory 977 and the WiFi chip 978. The shield can 969 may be disposed on and surround the internal frame 960 in order to protect the DDR memory 977 and the WiFi chip 978, as well as other circuit components, on the other side of the printed circuit board assembly 936.

The printed circuit board assembly 936 may include the audio jack 905 coupled to the bottom surface of the substrate at one end of printed circuit board assembly 936, and the micro-USB connector 975 coupled to the bottom surface of the substrate at the other end of the printed circuit board assembly 936. The printed circuit board assembly 936 may include an audio output circuit 930. In some examples, the audio output circuit 930 may be disclosed on the substrate outside the internal frame 960 and outside the shield can 969. In some examples, the audio output circuit 930 may be the audio output circuit 330 discussed with reference to FIG. 3.

The audio output circuit 930 may be configured to detect which type of audio output cord segment 910 is coupled to the audio streaming device 902. In some examples, the audio output circuit 930 may be configured to detect whether the connected audio output cord segment 910 is a digital-type cord or an analog-type cord. Depending on the type of cord detected, the audio output circuit 930 is configured to format the audio content to have the appropriate format corresponding to the detected cord type. For example, when the audio output circuit 930 detects that the audio output cord segment 910 is the digital-type cord, the audio output circuit 930 formats the audio content to a digital format. When the audio output circuit 930 detects that the audio output cord segment 910 is the analog-type cord, the audio output circuit 930 formats the audio content to an analog format.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A portable audio streaming device configured to stream audio content, the portable audio streaming device comprising:
    a housing having a top enclosure, and a bottom enclosure, the bottom enclosure being a housing structure separate from the top enclosure, the top enclosure being coupled to the bottom enclosure, the bottom enclosure having a sidewall, the sidewall having an opening to an audio jack configured to connect to an external audio cord, the sidewall having a universal serial bus (USB) connector configured to connect to a USB power cord; and
    a printed circuit board substrate disposed inside of the housing, the printed circuit board substrate having electronic circuitry configured to receive audio content wirelessly from an external computing device wirelessly coupled to the portable audio streaming device, the electronic circuitry including an audio output circuit configured to determine whether the external audio cord is a digital audio cord or an analog audio cord, the digital audio cord including an optical cord, the analog audio cord including an RCA cord, the audio output circuit configured to format the audio content according to a digital format in response to the external audio cord being determined as the digital audio cord, the audio output circuit configured to format the audio content according to an analog format in response to the external audio cord being determined as the analog audio cord, wherein the electronic circuitry is further configured to transmit the audio content through the external audio cord to an external speaker device.

2. The portable audio streaming device of claim 1, wherein the sidewall includes a reset button configured to reset the portable audio streaming device, the reset button protruding through an opening on the sidewall.

3. The portable audio streaming device of claim 1, further comprising:
    a heat spreader coupled to an internal surface of the bottom enclosure.

4. The portable audio streaming device of claim 1, wherein the bottom enclosure is a cylindrical structure that defines a diameter.

5. The portable audio streaming device of claim 1, wherein the printed circuit board substrate includes a first surface and a second surface, the second surface being opposite to the first surface, wherein the audio output circuit is coupled to the first surface, the electronic circuitry including a system on chip (SOC), wherein the SOC is coupled to the second surface.

6. The portable audio streaming device of claim 1, further comprising:
    a light pipe coupled to the bottom enclosure, wherein the electronic circuitry is configured to activate light through the light pipe such that activation of the light through the light pipe indicates an operating status of the portable audio streaming device.

7. A portable audio streaming device configured to stream audio content, the portable audio streaming device comprising:
    a housing having a top enclosure defining a top surface, and a bottom enclosure defining a bottom surface, the bottom enclosure having a sidewall disposed substantially perpendicular to the top surface and the bottom surface, the bottom enclosure being a housing structure separate from the top enclosure, the top enclosure being coupled to the bottom enclosure, the sidewall having an opening to an audio jack configured to connect to an external audio cord, the sidewall having a universal serial bus (USB) connector configured to connect to a USB power cord; and
    a printed circuit board substrate disposed inside of the housing, the printed circuit board substrate including electronic circuitry configured to receive audio content wirelessly from an external computing device wirelessly coupled to the portable audio streaming device, the electronic circuitry including an audio output circuit configured to determine whether the external audio cord is a digital audio cord or an analog audio cord, the digital audio cord including an optical cord, the analog audio cord including an RCA cord, the audio output circuit configured to format the audio content according to a digital format in response to the external audio cord being determined as the digital audio cord, the audio output circuit configured to format the audio content according to an analog format in response to the external audio cord being determined as the analog audio cord, wherein the electronic circuitry is further configured to transmit the audio content through the external audio cord to an external speaker device.

8. The portable audio streaming device of claim 7, wherein the housing has a diameter in a range of 45-55 millimeters.

9. The portable audio streaming device of claim 7, further comprising a light pipe protruding through an opening on the sidewall of the bottom enclosure.

10. The portable audio streaming device of claim 7, wherein the printed circuit board substrate includes a first surface and a second surface, the second surface being opposite to the first surface, the printed circuit board substrate including a plurality of integrated circuits, the plurality of integrated circuits including a first integrated circuit and a second integrated circuit, the first integrated circuit being disposed on the first surface, the second integrated circuit being disposed on the first surface, the printed circuit board substrate including an internal frame with a shield wall separating the first integrated circuit and the second integrated circuit, and a cover shield coupled to the internal frame, the cover shield covering the first integrated circuit and the second integrated circuit.

11. The portable audio streaming device of claim 7, wherein the bottom enclosure defines an internal surface, the portable audio streaming device including a heat spreader coupled to the internal surface of the bottom enclosure, and a thermal gel coupled to the heat spreader.

12. The portable audio streaming device of claim 7, further comprising:
a light pipe coupled to the bottom enclosure, wherein the electronic circuitry is configured to activate light through the light pipe such that activation of the light through the light pipe indicates an operating status of the portable audio streaming device.

13. A portable audio streaming device configured to stream audio content but not video content, the portable audio streaming device comprising:
a housing having a top enclosure defining a top surface, and a bottom enclosure defining a bottom surface, the bottom enclosure having a sidewall disposed substantially perpendicular to the top surface and the bottom surface, the bottom enclosure being a housing structure separate from the top enclosure, the top enclosure being coupled to the bottom enclosure, the sidewall having an opening to an audio jack configured to connect to an external audio cord, the sidewall having a universal serial bus (USB) connector configured to connect to a USB power cord;
a printed circuit board substrate disposed inside of the housing, the printed circuit board substrate including electronic circuitry configured to receive audio content wirelessly from an external computing device wirelessly coupled to the portable audio streaming device,
wherein the electronic circuitry includes an audio output circuit configured to determine whether the external audio cord is a digital audio cord or an analog audio cord, the digital audio cord including an optical cord, the analog audio cord including an RCA cord, the audio output circuit configured to format the audio content according to a digital format in response to the external audio cord being determined as the digital audio cord, the audio output circuit configured to format the audio content according to an analog format in response to the external audio cord being determined as the analog audio cord, the electronic circuitry being configured to transmit the audio content through the external audio cord to an external speaker device,
wherein the printed circuit board substrate includes a first surface and a second surface, the second surface being opposite to the first surface, the electronic circuitry including a system on chip (SOC), flash memory, Wi-Fi chip, and random access memory, wherein the SOC and the flash memory are coupled to the first surface, wherein the Wi-Fi chip, the random access memory, and the audio output circuit are coupled to the second surface.

14. The portable audio streaming device of claim 13, wherein the sidewall has a height in a range of 5-10 millimeters.

15. The portable audio streaming device of claim 13, wherein the housing has a substantially cylindrical shape with a diameter in a range of 45-55 millimeters.

16. The portable audio streaming device of claim 13, wherein the printed circuit board substrate includes a first shield having a first internal frame separating the SOC and the flash memory, and a first cover that covers the SOC and the flash memory, the printed circuit board substrate including a second shield having a second internal frame separating the Wi-Fi chip and the random access memory, and a second cover that covers the Wi-Fi chip and the random access memory.

17. The portable audio streaming device of claim 13, further comprising:
a light pipe coupled to the bottom enclosure, wherein the electronic circuitry is configured to activate light through the light pipe such that activation of the light through the light pipe indicates an operating status of the audio streaming device.

* * * * *